(12) United States Patent
Schultz et al.

(10) Patent No.: US 11,697,903 B2
(45) Date of Patent: Jul. 11, 2023

(54) ONLINE ORDERING AND JUST-IN-TIME MANUFACTURING OF LASER-FINISHED GARMENTS

(71) Applicant: Levi Strauss & Co., San Francisco, CA (US)

(72) Inventors: Jennifer Schultz, Boston, MA (US); Benjamin Bell, San Francisco, CA (US); Debdulal Mahanty, Fremont, CA (US); Ozgur Taylan Kuzucu, Walnut Creek, CA (US); Christopher Schultz, Boston, MA (US); James Barton Sights, San Francisco, CA (US)

(73) Assignee: Levi Strauss & Co., San Francisco, CA (US)

( * ) Notice: Subject to any disclaimer, the term of this patent is extended or adjusted under 35 U.S.C. 154(b) by 0 days.

(21) Appl. No.: 17/660,757

(22) Filed: Apr. 26, 2022

(65) Prior Publication Data
US 2022/0251777 A1   Aug. 11, 2022

Related U.S. Application Data

(63) Continuation of application No. 16/286,502, filed on Feb. 26, 2019, now Pat. No. 11,313,072.

(60) Provisional application No. 62/636,107, filed on Feb. 27, 2018.

(51) Int. Cl.
| | |
|---|---|
| *D06M 10/00* | (2006.01) |
| *D06C 23/02* | (2006.01) |
| *B23K 26/00* | (2014.01) |
| *B23K 26/352* | (2014.01) |
| *G06Q 30/06* | (2023.01) |
| *A41D 27/00* | (2006.01) |
| *A41H 3/00* | (2006.01) |
| *A41H 43/00* | (2006.01) |
| *A41H 42/00* | (2006.01) |
| *G06F 30/00* | (2020.01) |
| *G06Q 30/0601* | (2023.01) |
| *D06M 101/06* | (2006.01) |
| *G06F 113/12* | (2020.01) |

(52) U.S. Cl.
CPC .......... *D06M 10/005* (2013.01); *A41D 27/00* (2013.01); *A41H 3/007* (2013.01); *A41H 42/00* (2013.01); *A41H 43/00* (2013.01); *B23K 26/0006* (2013.01); *B23K 26/352* (2015.10); *D06C 23/02* (2013.01); *G06F 30/00* (2020.01); *G06Q 30/0621* (2013.01); *G06Q 30/0643* (2013.01); *D06C 2700/31* (2013.01); *D06M 2101/06* (2013.01); *D10B 2201/02* (2013.01); *D10B 2501/04* (2013.01); *G06F 2113/12* (2020.01)

(58) Field of Classification Search
CPC .......... D06M 10/005; D06M 2101/06; B23K 26/352; B23K 26/0006; G06F 30/00; G06F 2113/12; A41D 27/00; A41H 3/007; A41H 42/00; A41H 43/00; D06C 23/02; D06C 2700/31; G06Q 30/0621; G06Q 30/0643; D10B 2201/02; D10B 2501/04

See application file for complete search history.

(56) References Cited

U.S. PATENT DOCUMENTS

| | | | |
|---|---|---|---|
| 3,883,298 | A | 5/1975 | Platt |
| 3,983,132 | A | 9/1976 | Strobel |
| 4,527,383 | A | 7/1985 | Bingham |
| 5,015,849 | A | 5/1991 | Gilpatrick |
| 5,185,511 | A | 2/1993 | Yabu |
| 5,201,027 | A | 4/1993 | Casini |
| 5,367,141 | A | 11/1994 | Piltch |
| 5,537,939 | A | 7/1996 | Horton |
| 5,567,207 | A | 10/1996 | Lockman et al. |
| 5,573,851 | A | 11/1996 | Lengers et al. |
| 5,605,641 | A | 2/1997 | Chiba et al. |
| 5,839,380 | A | 11/1998 | Muto |
| 5,880,430 | A | 3/1999 | Wein |
| 5,916,461 | A | 6/1999 | Costin et al. |
| 5,990,444 | A | 11/1999 | Costin |
| 6,002,099 | A | 12/1999 | Martin et al. |
| 6,004,018 | A | 12/1999 | Kawasato et al. |

(Continued)

FOREIGN PATENT DOCUMENTS

| | | |
|---|---|---|
| CA | 2066978 A1 | 6/1993 |
| CN | 101187640 A | 5/2008 |

(Continued)

OTHER PUBLICATIONS

Tytti Alapieti, "Creating an Efficient and Scalable Manufacturing System for Customized Made-To-Measure Jeans", Master of Science thesis, 102 pgs., Tampere University of Technology, Finland, 2012, published online at: https://trepo.tuni.fi// handle/123456789/21068.*

(Continued)

*Primary Examiner* — Amina S Khan
(74) *Attorney, Agent, or Firm* — Aka Chan LLP

(57) ABSTRACT

An on-demand manufacturing of apparel system includes online customization and ordering of garments, previewing of the garments, manufacturing including laser finishing of garments, and delivery to the customer. Laser finishing of apparel products reduces finishing cost, lowers carrying costs, increases productivity, shortens time to market, be more reactive to trends, reduces product constraints, reduces lost sales and dilution, and more. Fabric templates can be used to produce a multitude of laser finishes. Operational efficiency is improved.

30 Claims, 29 Drawing Sheets

(56) References Cited

U.S. PATENT DOCUMENTS

| | | | |
|---|---|---|---|
| 6,086,966 A | 7/2000 | Gundjian et al. |
| 6,140,602 A | 10/2000 | Costin |
| 6,192,292 B1 | 2/2001 | Taguchi |
| 6,252,196 B1 | 6/2001 | Costin et al. |
| 6,315,202 B2 | 11/2001 | Costin et al. |
| 6,356,648 B1 | 3/2002 | Taguchi |
| 6,407,361 B1 | 6/2002 | Williams |
| 6,465,046 B1 | 10/2002 | Hansson et al. |
| 6,495,237 B1 | 12/2002 | Costin |
| 6,548,428 B1 | 4/2003 | Lanitz et al. |
| 6,576,862 B1 | 6/2003 | Costin et al. |
| 6,616,710 B1 | 9/2003 | Costin et al. |
| 6,664,505 B2 | 12/2003 | Martin |
| 6,685,868 B2 | 2/2004 | Costin |
| 6,689,517 B1 | 2/2004 | Kaminsky et al. |
| 6,706,785 B1 | 3/2004 | Fu |
| 6,726,317 B2 | 4/2004 | Codos |
| 6,753,501 B1 | 6/2004 | Costin, Sr. et al. |
| 6,765,608 B1 | 7/2004 | Himeda et al. |
| 6,807,456 B1 | 10/2004 | Costin, Jr. et al. |
| 6,819,972 B1 | 11/2004 | Martin et al. |
| 6,832,125 B2 | 12/2004 | Sonnenberg et al. |
| 6,836,694 B1 | 12/2004 | Podubrin |
| 6,836,695 B1 | 12/2004 | Goldman |
| 6,858,815 B1 | 2/2005 | Costin |
| 6,956,596 B2 | 10/2005 | Kataoka et al. |
| 6,962,609 B2 | 11/2005 | Rogers et al. |
| 6,974,366 B1 | 12/2005 | Johnson |
| 7,005,603 B2 | 2/2006 | Addington et al. |
| 7,054,043 B2 | 5/2006 | Mengel et al. |
| 7,057,756 B2 | 6/2006 | Ogasahara et al. |
| 7,072,733 B2 | 7/2006 | Magee et al. |
| 7,100,341 B2 | 9/2006 | McIlvaine |
| 7,240,408 B2 | 7/2007 | Latos et al. |
| 7,260,445 B2 | 8/2007 | Weiser et al. |
| 7,324,867 B2 | 1/2008 | Dinauer et al. |
| 7,699,896 B1 | 4/2010 | Colwell |
| 7,708,483 B2 | 5/2010 | Samii et al. |
| 7,728,931 B2 | 6/2010 | Hoffmuller |
| 7,863,584 B2 | 1/2011 | Tardif et al. |
| 7,937,173 B2 | 5/2011 | Weill et al. |
| 8,048,608 B2 | 11/2011 | Jarvis et al. |
| 8,278,244 B2 | 10/2012 | Stubbs et al. |
| 8,360,323 B2 | 1/2013 | Widzinski, Jr. et al. |
| 8,405,885 B2 | 3/2013 | Shah et al. |
| 8,460,566 B2 | 6/2013 | Costin, Jr. |
| 8,529,775 B2 | 9/2013 | Costin et al. |
| 8,556,319 B2 | 10/2013 | Petouhoff et al. |
| 8,581,142 B2 | 11/2013 | Colico et al. |
| 8,585,956 B1 | 11/2013 | Pagryzinski et al. |
| 8,734,679 B2 | 5/2014 | Marguerettaz et al. |
| 8,794,724 B2 | 8/2014 | Costin, Sr. et al. |
| 8,849,444 B2 | 9/2014 | George |
| 8,883,293 B2 | 11/2014 | Weedlun et al. |
| 8,921,732 B2 | 12/2014 | Costin et al. |
| 8,974,016 B2 | 3/2015 | Costin, Sr. et al. |
| 9,034,089 B2 | 5/2015 | Jarvis et al. |
| 9,050,686 B2 | 6/2015 | Costin, Sr. et al. |
| 9,126,423 B2 | 9/2015 | Costin, Sr. et al. |
| 9,213,929 B2 | 12/2015 | Tazaki et al. |
| 9,213,991 B2 | 12/2015 | Bhardwaj et al. |
| 9,333,787 B2 | 5/2016 | Cape et al. |
| 9,364,920 B2 | 6/2016 | Costin et al. |
| 2002/0137417 A1 | 9/2002 | Tebbe |
| 2002/0179580 A1 | 12/2002 | Costin |
| 2003/0089782 A1 | 5/2003 | Reed |
| 2004/0067706 A1 | 4/2004 | Woods |
| 2005/0131571 A1 | 6/2005 | Costin |
| 2006/0014099 A1 | 1/2006 | Faler et al. |
| 2006/0090868 A1 | 5/2006 | Brownfield et al. |
| 2007/0161304 A1 | 7/2007 | Wangbunyen |
| 2007/0205541 A1 | 9/2007 | Allen et al. |
| 2008/0023169 A1 | 1/2008 | Fernandes et al. |
| 2008/0138543 A1 | 6/2008 | Hoshino et al. |
| 2008/0153374 A1 | 6/2008 | Thiriot |
| 2008/0280107 A1 | 11/2008 | Katschorek et al. |
| 2009/0112353 A1 | 4/2009 | Kirefu et al. |
| 2009/0162621 A1 | 6/2009 | Craamer et al. |
| 2009/0266804 A1 | 10/2009 | Costin et al. |
| 2010/0183822 A1 | 7/2010 | Ruggie et al. |
| 2010/0279079 A1 | 11/2010 | Campbell et al. |
| 2011/0101088 A1 | 5/2011 | Marguerettaz et al. |
| 2011/0187025 A1 | 8/2011 | Costin, Sr. |
| 2011/0261141 A1 | 10/2011 | Costin, Sr. et al. |
| 2011/0295410 A1 | 12/2011 | Yamada et al. |
| 2012/0061470 A1 | 3/2012 | Marguerettaz et al. |
| 2012/0182375 A1 | 7/2012 | Shourvarzi et al. |
| 2012/0197429 A1 | 8/2012 | Nykyforov |
| 2014/0277663 A1* | 9/2014 | Gupta .................. G06Q 50/04 700/98 |
| 2014/0342903 A1 | 11/2014 | Jarvis et al. |
| 2015/0030821 A1 | 1/2015 | Costin, Sr. et al. |
| 2015/0079359 A1 | 3/2015 | Costin, Jr. |
| 2015/0106993 A1 | 4/2015 | Hoffman et al. |
| 2015/0119238 A1 | 4/2015 | Pretsch et al. |
| 2015/0121965 A1 | 5/2015 | Costin et al. |
| 2015/0153278 A1 | 6/2015 | Erkelenz et al. |
| 2015/0183231 A1 | 7/2015 | Costin, Sr. et al. |
| 2015/0298253 A1 | 10/2015 | Constin, Jr. et al. |
| 2015/0343568 A1 | 12/2015 | Constin, Jr. et al. |
| 2015/0361597 A1 | 12/2015 | Candrian |
| 2016/0016879 A1 | 1/2016 | Bertin et al. |
| 2016/0060807 A1 | 3/2016 | Tharpe et al. |
| 2016/0251782 A1 | 9/2016 | Liao et al. |
| 2016/0263928 A1* | 9/2016 | Costin, Jr. ............. D06P 5/2005 |
| 2016/0361937 A1 | 12/2016 | Costin, Sr. et al. |
| 2016/0362820 A1 | 12/2016 | Livecchi |

FOREIGN PATENT DOCUMENTS

| | | |
|---|---|---|
| CN | 102371830 A | 3/2012 |
| CN | 102704215 A | 10/2012 |
| CN | 104687695 A | 6/2015 |
| CN | 204398442 U | 6/2015 |
| CN | 204653890 U | 9/2015 |
| CN | 104983103 A | 10/2015 |
| DE | 1965103 A1 | 7/1971 |
| DE | 3916126 A1 | 11/1990 |
| EP | 0328320 A1 | 8/1989 |
| EP | 1279460 A1 | 1/2003 |
| EP | 1459836 A2 | 9/2004 |
| ES | 2147473 A1 | 9/2000 |
| GB | 1259530 A | 1/1972 |
| GB | 1294116 A | 10/1972 |
| GB | 2199462 A | 7/1988 |
| GB | 2294656 A | 5/1996 |
| GB | 2448763 A | 10/2008 |
| JP | 11291368 A | 10/1999 |
| TW | M276842 U | 5/1994 |
| WO | 8202689 A1 | 8/1982 |
| WO | WO/2001/025824 | 4/2001 |
| WO | 0214077 A1 | 2/2002 |
| WO | 2004045857 A2 | 6/2004 |
| WO | 2008072853 A1 | 6/2008 |
| WO | 2010017648 A1 | 2/2010 |
| WO | 2011143471 A1 | 11/2011 |
| WO | 2012016316 A1 | 2/2012 |
| WO | 2013137836 A1 | 9/2013 |
| WO | WO/2015/042441 | 3/2015 |
| WO | 2016065134 A1 | 4/2016 |
| WO | WO/2018/035538 | 2/2018 |
| WO | WO/2018/112110 | 6/2018 |
| WO | WO/2018/112113 | 6/2018 |

OTHER PUBLICATIONS

International Search Report, PCT Application PCT/US2019/019684, dated Jun. 20, 2019, 4 pages.

* cited by examiner

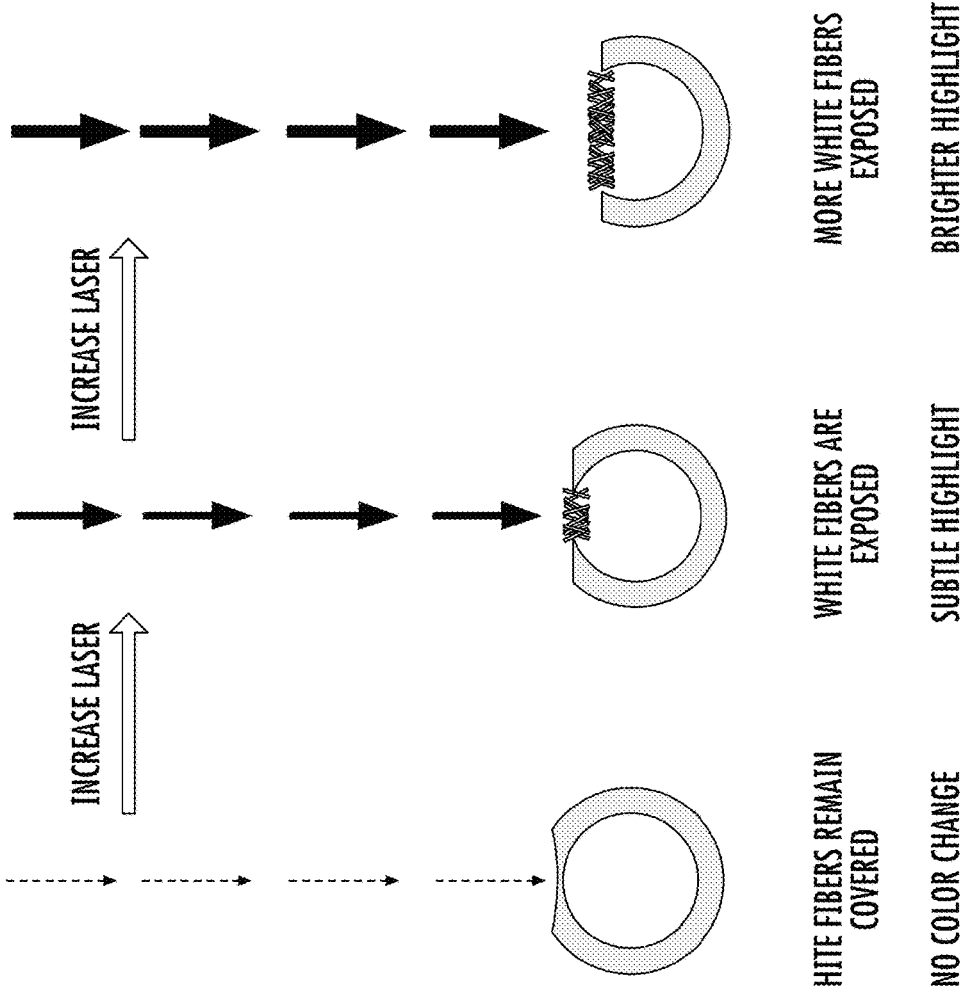

ONLINE ORDERING AND JUST-IN-TIME MANUFACTURING OF LASER-FINISHED GARMENTS

CROSS-REFERENCE TO RELATED APPLICATIONS

This patent application is a continuation of U.S. patent application Ser. No. 16/286,502, filed Feb. 26, 2019, issued as U.S. Pat. No. 11,313,072 on Apr. 26, 2022, which claims the benefit of U.S. patent application 62/636,107, filed Feb. 27, 2018. These applications are incorporated by reference along with all other references cited in this application.

BACKGROUND OF THE INVENTION

The present invention relates to the manufacture of apparel, and more specifically, the on-demand manufacture of apparel, including denim products such as jeans, shirts, shorts, jackets, vests, and skirts, where finishing is performed by laser to obtain a faded, distressed, washed, or worn finish, or other desired appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about 20 to 60 liters of water to finish each pair of jeans.

Therefore, there is a need for a technique of on-demand manufacturing of laser-finished apparel, including jeans, denim clothing, and other garments. Laser finishing of reduces environmental impact, processing time, and processing costs, while maintaining the look and style of traditional finishing techniques.

BRIEF SUMMARY OF THE INVENTION

An on-demand manufacturing of apparel system includes online customization and ordering of garments, previewing of the garments, manufacturing including laser finishing of garments, and delivery to the customer. Laser finishing of apparel products reduces finishing cost, lowers carrying costs, increases productivity, shortens time to market, be more reactive to trends, reduces product constraints, reduces lost sales and dilution, and more. Fabric templates can be used to produce a multitude of laser finishes. Operational efficiency is improved Further, a tool allows a user to create new designs for apparel and preview these designs before manufacture. Software and lasers are used in finishing apparel to produce a desired wear pattern or other design. Based on a laser input file with a pattern, a laser will burn the pattern onto apparel. With the tool, the user will be able to create, make changes, and view images of a design, in real time, before burning by a laser. Input to the tool includes fabric template images, laser input files, and damage input. The tool allows adding of tinting and adjusting of intensity and bright point. The user can also move, rotate, scale, and warp the image input.

In an implementation, a system includes a collection of first garments of a first base template, a collection of second garments of a second base template, an ordering tool, and a laser finishing facility including a laser that performs laser finishing on assembled garment templates. An input to the laser finishing facility includes a user order from the ordering tool received through a network, which connects the ordering tool to the laser finishing facility. Based on a laser input file associated with the user order, a laser removes selected amounts of material from the surface of a garment of the selected base template. For lighter pixel locations of the finishing pattern, a greater amount of the dyed cotton warp yarn is removed by a laser machine of the laser finishing facility, while for darker pixel locations of the finishing pattern, a lesser amount of the dyed cotton warp yarn is removed by the laser. An output of the laser finishing facility is a manufactured garment where the laser has removed selected amounts of material from the surface according to the user order and the manufactured garment has an appearance as displayed by the digital design tool as the preview image.

In an implementation, a method includes: assembling an unfinished garment made from fabric panels of a woven first material has a warp including indigo ring-dyed cotton yarn, where the fabric panels are sewn together using thread; washing the unfinished garment according to a base wash recipe to obtain a base garment; using a digital design tool, selecting a base template corresponding to the base garment and selecting a finishing pattern to apply to the base template, where the selected base template and selected finishing pattern include a garment design created using the digital design tool, and the digital design tool includes a preview tool; using the preview tool, showing a preview image of the garment selected finishing pattern on the base template, where the preview image represents the garment after laser finishing; and at a laser finishing facility, receiving an order corresponding to the garment design created using the digital design tool, and using a laser, creating a finishing pattern on an outer surface of a base garment that corresponds to the selected base template using a laser input file including the selected finishing pattern to obtain a finished garment represented by the preview image, where based on the laser input file, the laser removes selected amounts of material from the surface of the unfinished base garment at different pixel locations.

In an implementation, a system includes a first fabric roll of woven material, a second fabric roll, an ordering tool to create a user order, a laser finishing facility including a laser that performs laser finishing on fabric rolls before assembly into a garment, a cutting machine to cut the laser-finished panels from the fabric rolls, a sewing machine to assemble together the cut laser-finished panels into a sewn-together garment, and a washing machine that washes the sewn-together garment using a base wash recipe that corresponds to the requested finish in the user order.

In an implementation, a method includes: providing a fabric roll of woven material having a warp yarn including indigo-dyed cotton yarn, where the fabric roll corresponds to a base template; using a digital design tool, selecting a base template from a number of available base templates and selecting a finishing pattern to apply to the base template, where the selected base template and selected finishing pattern constitute a garment design created using the digital design tool, and the digital design tool includes a preview tool; using the preview tool, showing a preview image of the garment selected finishing pattern on the base template, where the preview image represents the garment after laser finishing; at a laser finishing facility, receiving an order corresponding to the garment design created using the digital design tool, and using a laser, creating a finishing pattern on an outer surface of the fabric roll that corresponds to the selected base template using a laser input file comprising the selected finishing pattern, where based on the laser input file, the laser removes selected amounts of material from the surface of the fabric roll at different pixel locations; cutting panels for the garment design from the laser-finished fabric roll; assembling the laser-finished panels together into a sewn garment; and washing the sewn garment according to a base wash recipe to obtain a finished garment having an appearance represented by the preview image.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 16-19 show how the laser alters the color of ring-dyed yarn.

DETAILED DESCRIPTION OF THE INVENTION

Figure 1:
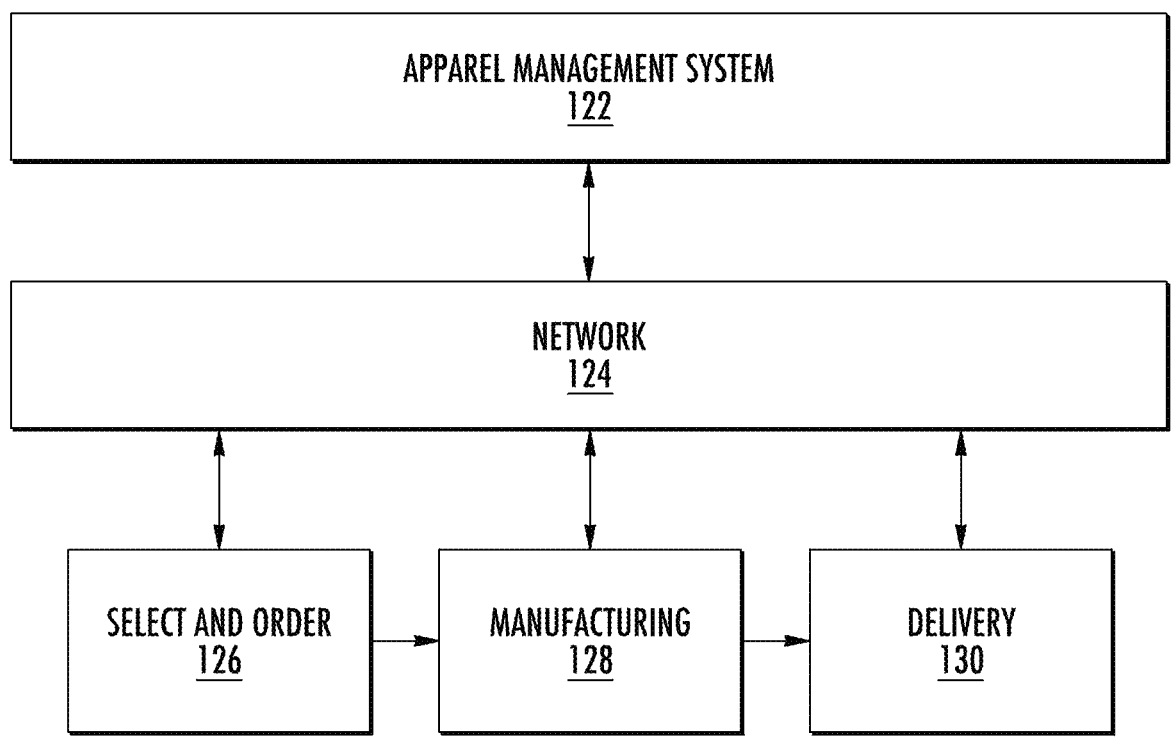
FIG. 1 shows a system for on-demand manufacturing of laser-finished apparel.

FIG. 1 shows a system for on-demand manufacturing of laser-finished apparel. There is an apparel management system 122, which controls operation of the system. The apparel management system is connected by a network 124 to components of the system, including select and order 126, manufacturing 128, and delivery 130 components. The network can be a computer network, such as the Internet.

Using the select and order component, a customer selects a garment to order. The selection process can include customizing and selecting a fit, style, and size of one or more garments. As an example, the customer can order a garment via a Web site managed by the apparel management system. After the customer completes the order, the order is sent via the network (e.g., Internet) to the apparel management system.

The apparel management system sends the order to the manufacturing component, where the order is made. Manufacturing can include cutting the fabric material, assembling or sewing together the cut panels, and finishing the apparel item using a laser. An apparel manufacturer can have numerous manufacturing centers, and the apparel management system will send the order to a manufacturing center that is appropriate for the customer and order. The determination is based on a location of the customer (e.g., shipping time to customer from manufacturing center) and the apparel item selected (e.g., availability of material). The system ensures the order will be fulfilled efficiently in short amount of time.

In an implementation, the laser finishing is done after the garment is assembled. Specifically, the material is cut, assembled into a garment, and then the garment is finished using a laser. The finishing is based on style or customization selected by the customer in the order.

In another implementation, the laser finishing is before the garment is assembled. Specifically, before the material is cut, fabric rolls or sheets of material are finished using the laser. The finishing is based on style or customization selected by the customer in the order. Then the material is cut into panels, and the panels are assembled into the garment.

After manufacturing of the garments of the order is complete, the apparel management system controls shipping and delivering of the ordered garments to the customer. The apparel management system can send the customer a tracking number for a package with the order when the order is shipped.

Depending on various factors which may delay manufacture of some items, an order with multiple items may be sent to the customer in multiple partial shipments rather than a single complete shipment. The items not shipped at the same time will be shipped later when available. The apparel management system handles communicating with the customer regarding delays and provides an estimate of when the customer can expect to receive the items of the order.

Figure 2:
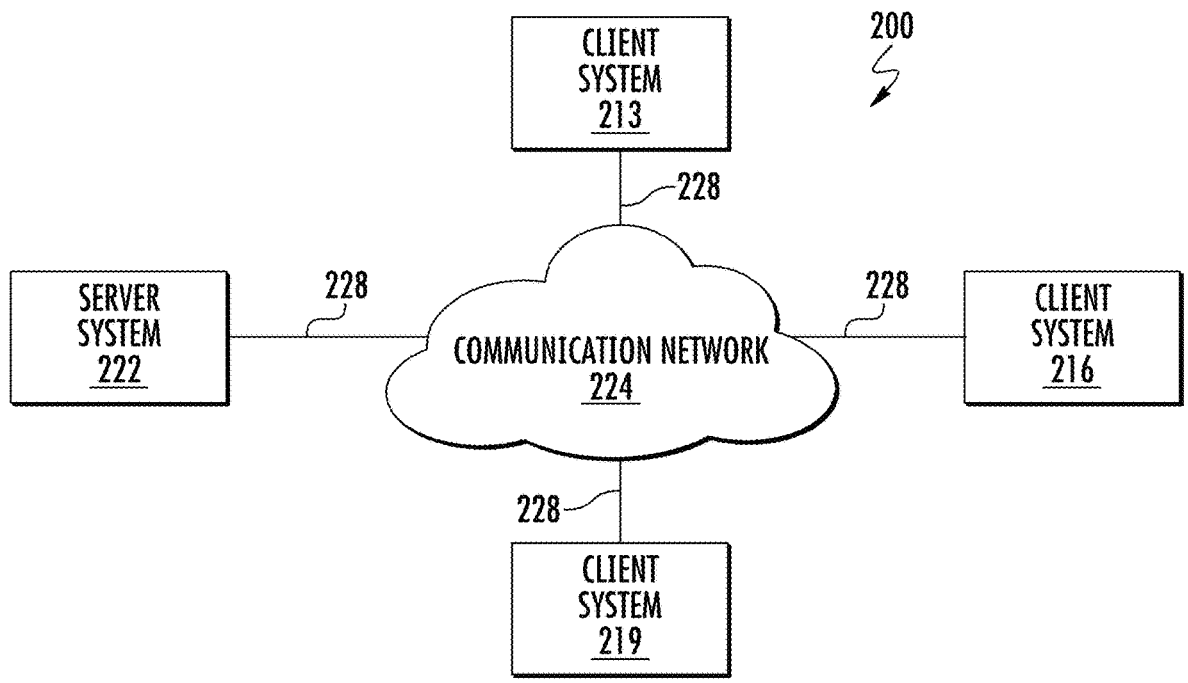
FIG. 2 shows a distributed computer network.

A system for on-demand manufacturing of laser-finished apparel can include one or more computers to control or monitor operation, or both. FIG. 2 shows an example of a computer that is part of, for example, the apparel management system, order component, manufacturing component, delivery component, or laser finishing system, or any combination of these. The computer may be a separate unit that is connected to a system, or may be embedded in electronics of the system. In an embodiment, the system includes software that executes on a computer workstation system or server, such as shown in FIG. 2.

FIG. 2 is a simplified block diagram of a distributed computer network 200 incorporating an embodiment of the present invention. Computer network 200 includes a number of client systems 213, 216, and 219, and a server system 222 coupled to a communication network 224 via a plurality of communication links 228. Communication network 224 provides a mechanism for allowing the various components of distributed network 200 to communicate and exchange information with each other.

Communication network 224 may itself be comprised of many interconnected computer systems and communication links. Communication links 228 may be hardwire links, optical links, satellite or other wireless communications links, wave propagation links, or any other mechanisms for communication of information. Communication links 228 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 2. These communication protocols may include VLAN, MPLS, TCP/IP, Tunneling, HTTP protocols, wireless application protocol (WAP), vendor-specific protocols, customized protocols, and others. While in one embodiment, communication network 1024 is the Internet, in other embodiments, communication network 1024 may be any suitable communication network including a local area network (LAN), a wide area network (WAN), a wireless network, an intranet, a private network, a public network, a switched network, and combinations of these, and the like.

Distributed computer network 200 in FIG. 2 is merely illustrative of an embodiment incorporating the present invention and does not limit the scope of the invention as recited in the claims. One of ordinary skill in the art would recognize other variations, modifications, and alternatives. For example, more than one server system 222 may be connected to communication network 224. As another example, a number of client systems 213, 216, and 219 may be coupled to communication network 224 via an access provider (not shown) or via some other server system.

Client systems 213, 216, and 219 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 222 is responsible for receiving information requests from client systems 213, 216, and 219, performing processing required to satisfy the requests, and for forwarding the results corresponding to the requests back to the requesting client system. The processing required to satisfy the request may be performed by server system 222 or may alternatively be delegated to other servers connected to communication network 224.

Client systems 213, 216, and 219 enable users to access and query information stored by server system 222. In a specific embodiment, the client systems can run as a standalone application such as a desktop application or mobile smartphone or tablet application. In another embodiment, a "Web browser" application executing on a client system enables users to select, access, retrieve, or query information stored by server system 222. Examples of Web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 3:
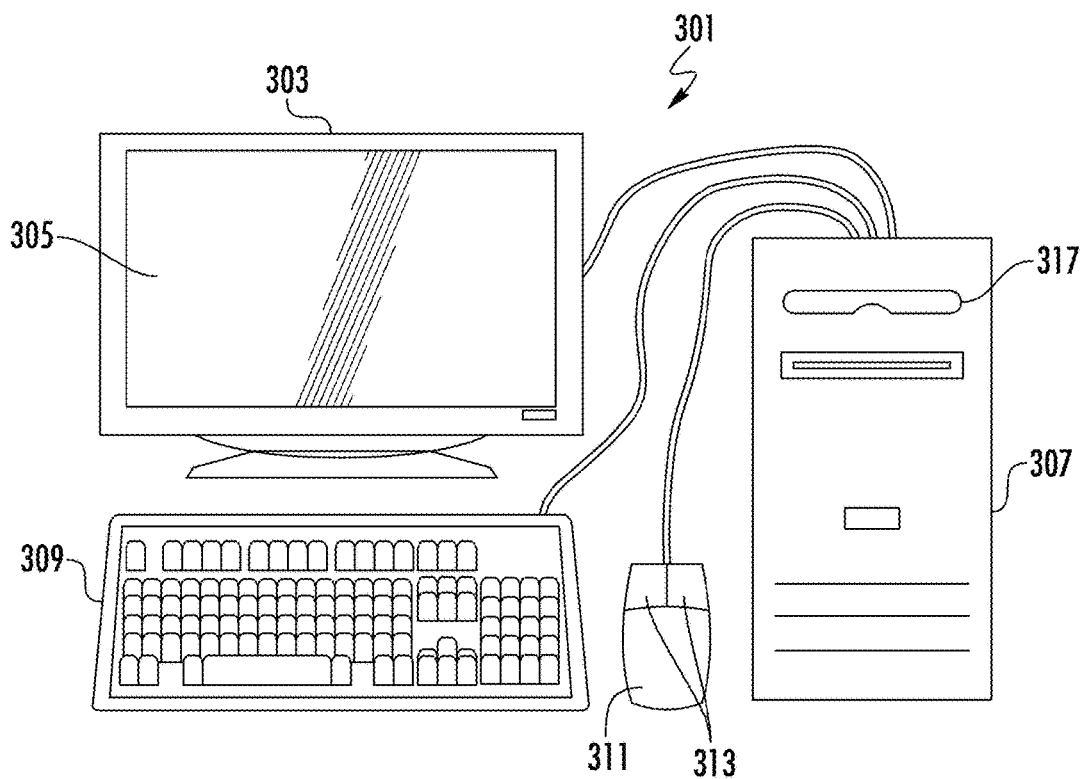
FIG. 3 shows a computer system that can be used in laser finishing.

FIG. 3 shows an exemplary client or server system of the present invention. In an embodiment, a user interfaces with the system through a computer workstation system, such as shown in FIG. 3. FIG. 3 shows a computer system 301 that includes a monitor 303, screen 305, enclosure 307 (may also be referred to as a system unit, cabinet, or case), keyboard or other human input device 309, and mouse or other pointing device 311. Mouse 311 may have one or more buttons such as mouse buttons 313.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad, Apple iPad Pro, or Apple iPad mini), Apple iPod (e.g, Apple iPod Touch), Samsung Galaxy product (e.g., Galaxy S series product or Galaxy Note series product), Google Nexus and Pixel devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 307 houses familiar computer components, some of which are not shown, such as a processor, memory, mass storage devices 317, and the like. Mass storage devices 317 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 317. The source code of the software of the present invention may also be stored or reside on mass storage device 317 (e.g., hard disk, magnetic disk, tape, or CD-ROM). As a further example, code of the invention may be transmitted via wires, radio waves, or through a network such as the Internet.

Figure 4:
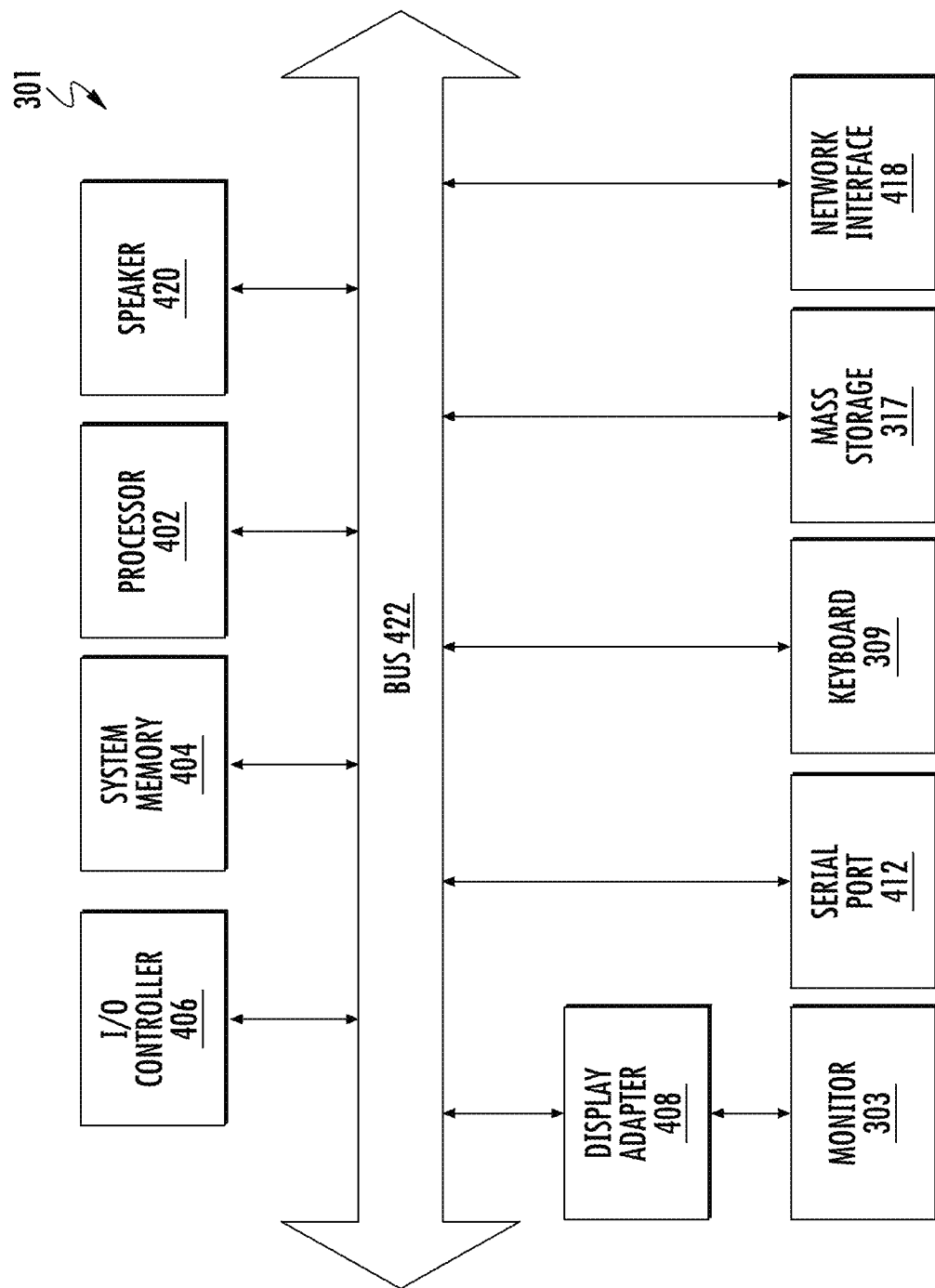
FIG. 4 shows a system block diagram of the computer system.

FIG. 4 shows a system block diagram of computer system 301 used to execute the software of the present invention. As in FIG. 3, computer system 301 includes monitor 303, keyboard 309, and mass storage devices 1117. Computer system 301 further includes subsystems such as central processor 402, system memory 404, input/output (I/O) controller 406, display adapter 408, serial or universal serial bus (USB) port 412, network interface 418, and speaker 420. The invention may also be used with computer systems with additional or fewer subsystems. For example, a computer system could include more than one processor 402 (i.e., a multiprocessor system) or a system may include a cache memory.

Arrows such as 422 represent the system bus architecture of computer system 301. However, these arrows are illustrative of any interconnection scheme serving to link the subsystems. For example, speaker 420 could be connected to the other subsystems through a port or have an internal direct connection to central processor 402. The processor may include multiple processors or a multicore processor, which may permit parallel processing of information. Computer system 301 shown in FIG. 4 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a Web application from one or more servers using a network connection with the server or servers and load the Web application in a Web browser. For example, a Web application can be downloaded from an application server over the Internet by a Web browser. Nonnative applications can also be obtained from other sources, such as a disk.

Figure 5:
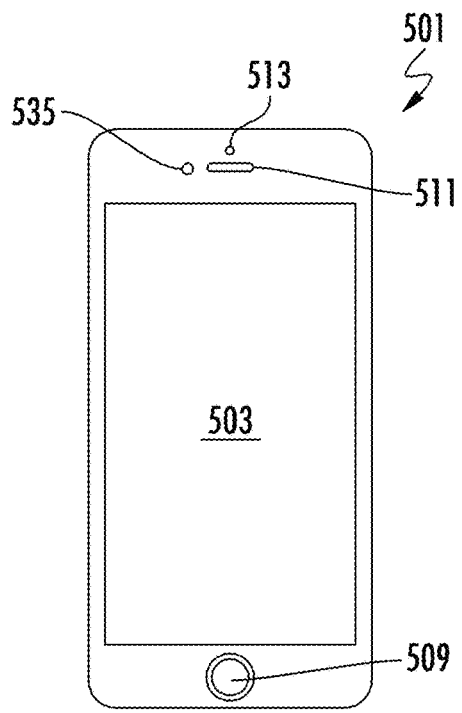
FIGS. 5-6 show examples of mobile devices.
Figure 6:
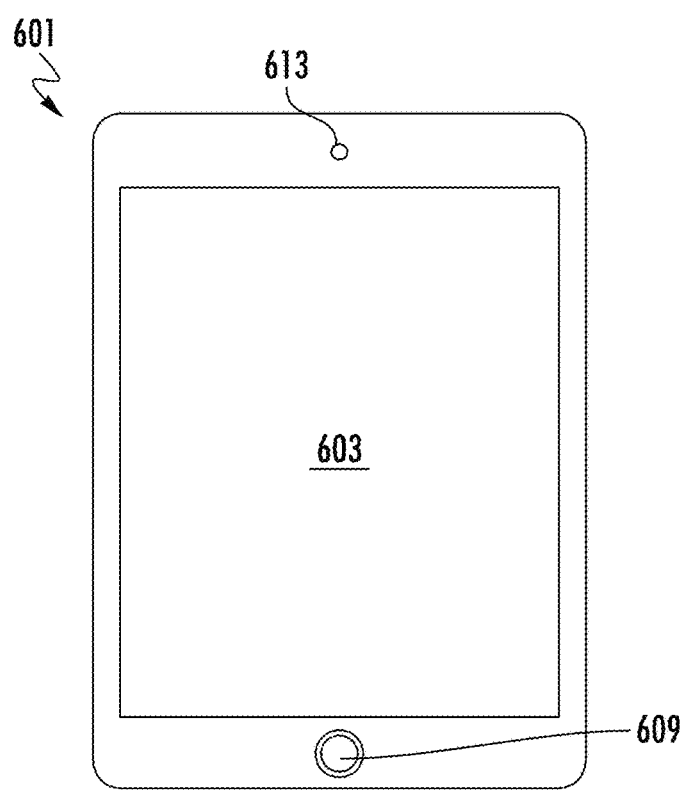

FIGS. 5-6 show examples of mobile devices, which can be mobile clients. Mobile devices are specific implementations of a computer, such as described above. FIG. 5 shows a smartphone device 501, and FIG. 6 shows a tablet device 601. Some examples of smartphones include the Apple iPhone, Samsung Galaxy, and Google Nexus family of devices. Some examples of tablet devices include the Apple iPad, Apple iPad Pro, Samsung Galaxy Tab, and Google Nexus family of devices.

Smartphone 501 has an enclosure that includes a screen 503, button 509, speaker 511, camera 513, and proximity sensor 535. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 509 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 601 is similar to a smartphone. Tablet 601 has an enclosure that includes a screen 603, button 609, and camera 613. Typically the screen (e.g., touch screen) of a tablet is larger than a smartphone, usually 7, 8, 9, 10, 12, 13, or more inches (measured diagonally).

Figure 7:
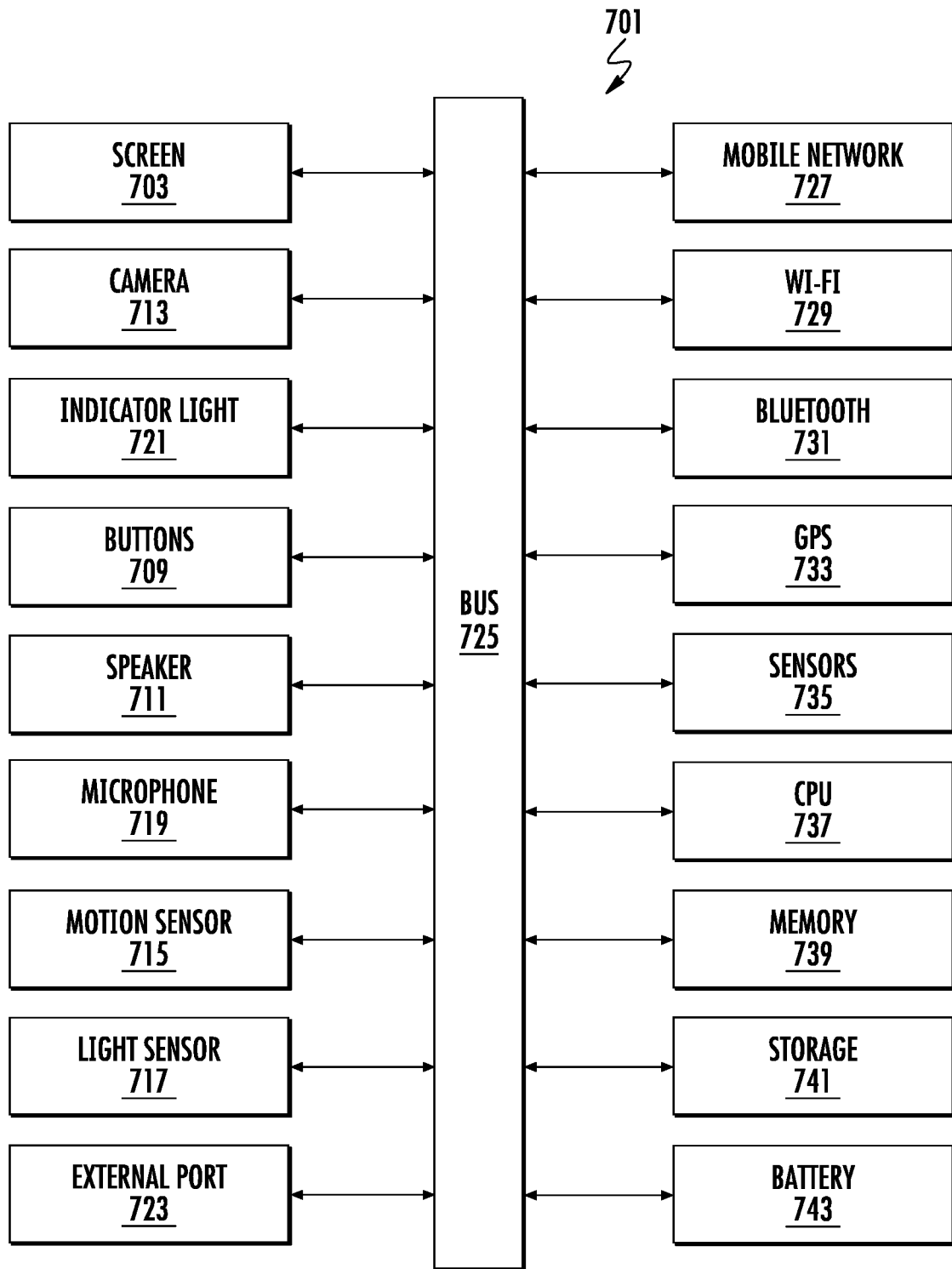
FIG. 7 shows a system block diagram of a mobile device.

FIG. 7 shows a system block diagram of mobile device 701 used to execute the software of the present invention. This block diagram is representative of the components of a smartphone or tablet device. The mobile device system includes a screen 703 (e.g., touch screen), buttons 709, speaker 711, camera 713, motion sensor 715, light sensor 717, microphone 719, indicator light 721, and external port 723 (e.g., USB port or Apple Lightning port). These components can communicate with each other via a bus 725.

The system includes wireless components such as a mobile network connection 727 (e.g., mobile telephone or mobile data), Wi-Fi 729, Bluetooth 1531, GPS 733 (e.g., detect GPS positioning), other sensors 735 such as a proximity sensor, CPU 1537, RAM memory 739, storage 741 (e.g., nonvolatile memory), and battery 743 (lithium ion or lithium polymer cell). The battery supplies power to the electronic components and is rechargeable, which allows the system to be mobile.

Figure 8:
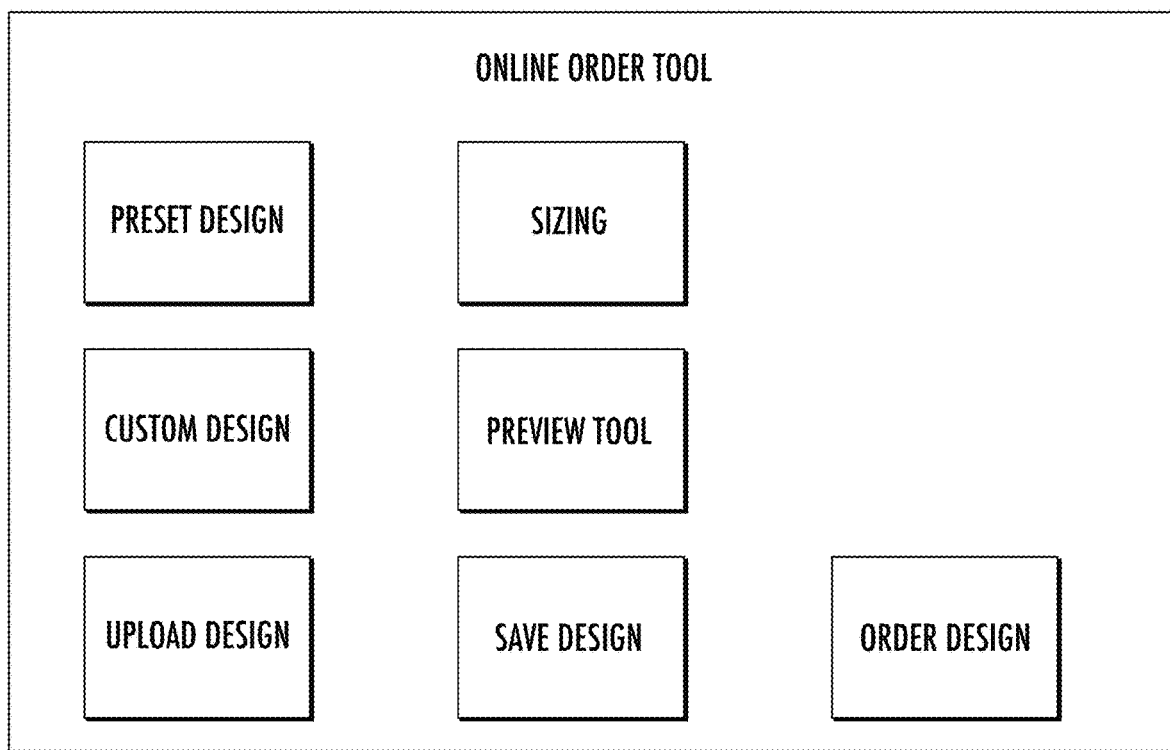
FIG. 8 shows an online order tool, which is part of the select and order component.

FIG. 8 shows an online order tool, which can be part of the select and order component of the on-demand manufacturing of laser-finished apparel. Using the online order tool, the customer can order a garment for on-demand manufacture. The order tool allows the customer to select a design, preview the design, and order the design. The customer can select a preset design, make a custom design, or make semicustom design. A semicustom design is a design based on a previous design, such as a preset design or a previously saved design, that is modified to obtain a new design. The tool also allows the customer upload a design or portion or a design to be manufacture. For example, an image can be captured by a camera, that is then uploaded via the order tool. The order tool allows selection of sizing.

Figure 9:
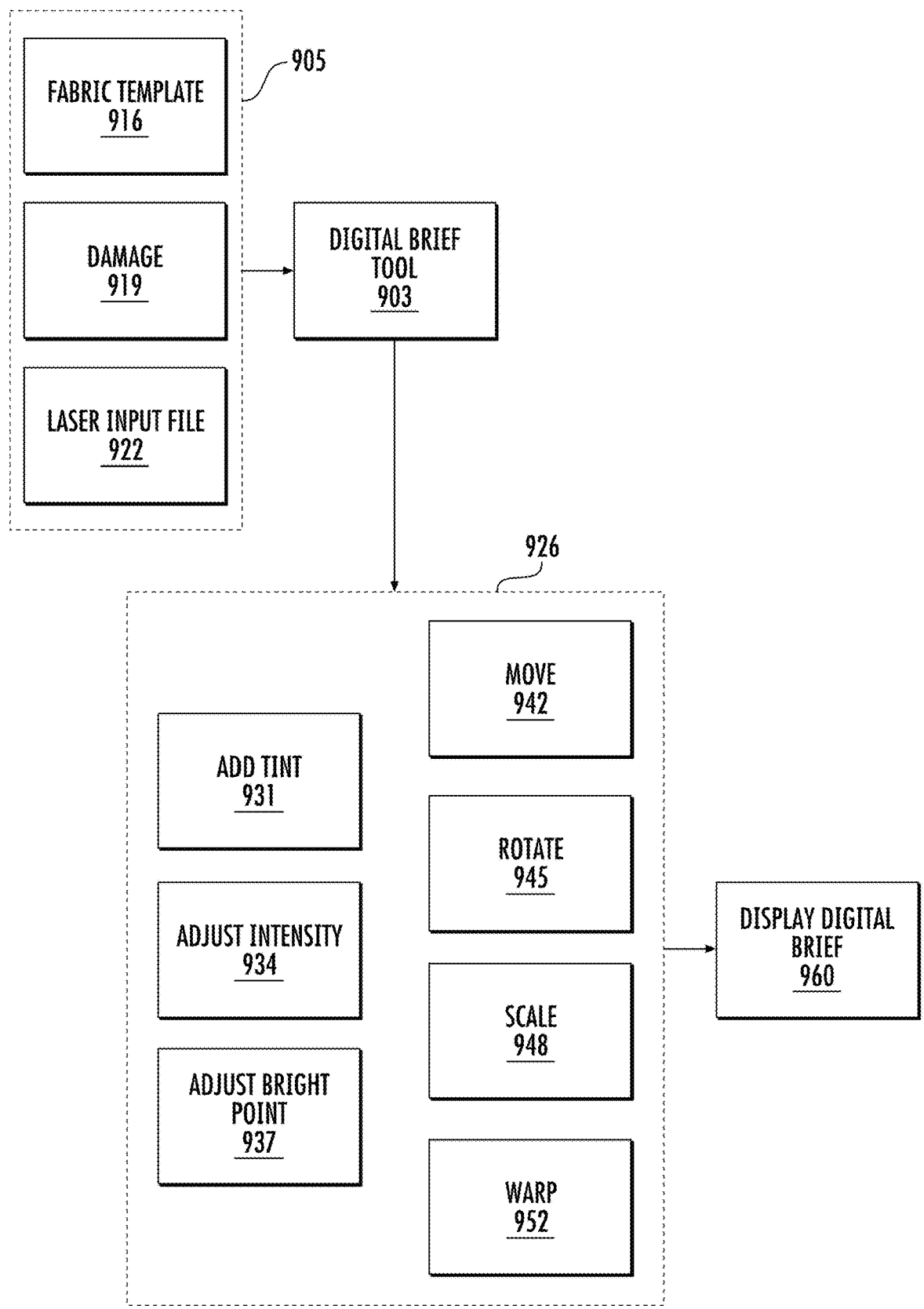
FIG. 9 shows a block diagram of a brief tool.

FIG. 9 shows a block diagram of a digital brief tool 903, which provides a real-time preview of an appearance of pair of jeans when a finishing pattern is applied by burning using a laser input file. The digital brief tool has additional features to allow more flexible designing of jeans.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

The digital brief tool takes as input three types of digital assets 905, fabric template input 916, damage input 919, and laser input file 922. Fabric template input 916 and laser input file 922 are similar to the inputs for the preview tool. Damage input 919 is an image of damage (e.g., holes, rips, shredded regions, or openings of various shapes and sizes) that can be burned by a laser into jeans. The digital brief tool overlays the damage and laser input files over the fabric template.

The user selects a fabric template input, which an image of a jeans style in a particular base fit fabric. The user can optionally select one or more damage inputs. If a damage input is selected, the damage input will be a layer that overlays the fabric template layer. As for the preview tool, the user selects a laser input file with laser pattern and overlays the fabric template layer. As the user selects the inputs, the user will be able to see in real time the inputs and any changes or updates in a preview image or brief.

After the inputs are selected, the user can select and perform one or more operations 926 on the inputs using the digital brief tool. These operations including adding tint 931, adjusting intensity 934, adjusting bright point 937, move digital asset 942, rotate digital asset 945, scale digital asset 948, and warp digital asset 952. As the user selects and performs one or more operations, the user will be able to see in real time the changes or updates in the preview image or brief.

After the fabric template input, the user can add tinting 931. Tinting will adjust the hue of the color of the fabric template input. Tinting is representative of the tinting which can be added during the postlaser wash or finishing II, described above. The user will be able to select a tint color, and this tint color will be blended with the existing color of the fabric template input. The amount or intensity of the tinting can be increased or decreased, such as by using a slider bar.

The user can adjust intensity 934. In an implementation, intensity adjusts a weight matrix by a percentage of each value in the array. In an implementation, intensity (or brightness) adjusts an opacity of a generated adjustment layer (see hue saturation lightness adjustment layer described below). The greater the opacity, the more opaque this layer will appear in the preview or brief image. The less the opacity, the less opaque this layer will appear in the preview or brief image; the layer will appear more transparent so that the layer beneath will show through more.

When increasing brightness, the opacity of the adjustment layer increases, and since the adjustment layer is above the fabric template input, the generated adjustment layer will become more prominent or visible, thus making this layer (which has the wear pattern) brighter. Similarly, when decreasing brightness, the opacity of the adjustment layer decreases, the generated adjustment layer will become less prominent or visible, thus making this layer (which has the wear pattern) less bright or fainter. The amount of the intensity can be increased or decreased, such as by using a slider bar.

The user can adjust bright point 937. Bright point adjusts the effect of the laser input file on the fabric template input. In an implementation, bright point adjustment changes a midpoint of a grayscale, creating a piecewise linear mapping of the pattern file.

Increasing the bright point will increase an effect of the laser pattern (e.g., causing greater laser pattern highlights) in the laser input file on the fabric template input, while decreasing the bright point does the opposite (e.g., diminishing laser pattern highlights). The bright point adjustment can be analogous to changing a pixel time or the time that the laser stays at a particular position for a given input from the laser input file. The amount of the bright point can be increased or decreased, such as by using a slider bar.

The user can move 942 or reposition a selected digital asset. For example, a damage input (or fabric template or laser file) may be moved to a position desired by the user. The user can rotate 945 a selected digital asset. For example, a damage input (or fabric template or laser file) may be rotated to any angle relative to the other layers as desired by the user.

The user can scale 948 a selected digital asset. This scaling can be locked, maintaining the original aspect ratio of the digital asset, or can be unlocked, such that the user can change the aspect ratio. The user can warp 952 a selected digital asset. With warping, the user can adjust an aspect ratio of a portion of the digital asset differently from another portion. For example, one portion of a damage input (or fabric template or laser file) can be squished (e.g., right and left edges of image pushed toward each other) while another portion is expanded (e.g., right and left edges of image pulled away from each other).

After the user has performed selected operations 926, the digital brief tool shows a digital brief or preview 960, an image of the jeans with the laser finishing pattern, including any tinting, damage, or other adjustments, as created by the user. This preview image can be saved and viewed again later. A user can create multiple designs, and these can be saved together as part of a collection.

The sizing of apparel can be according to ranges or brackets, such as small, medium, and large, or based on certain measurements, such as waist size and inseam length for pants, and chest size and sleeve length for tops.

Figure 10:
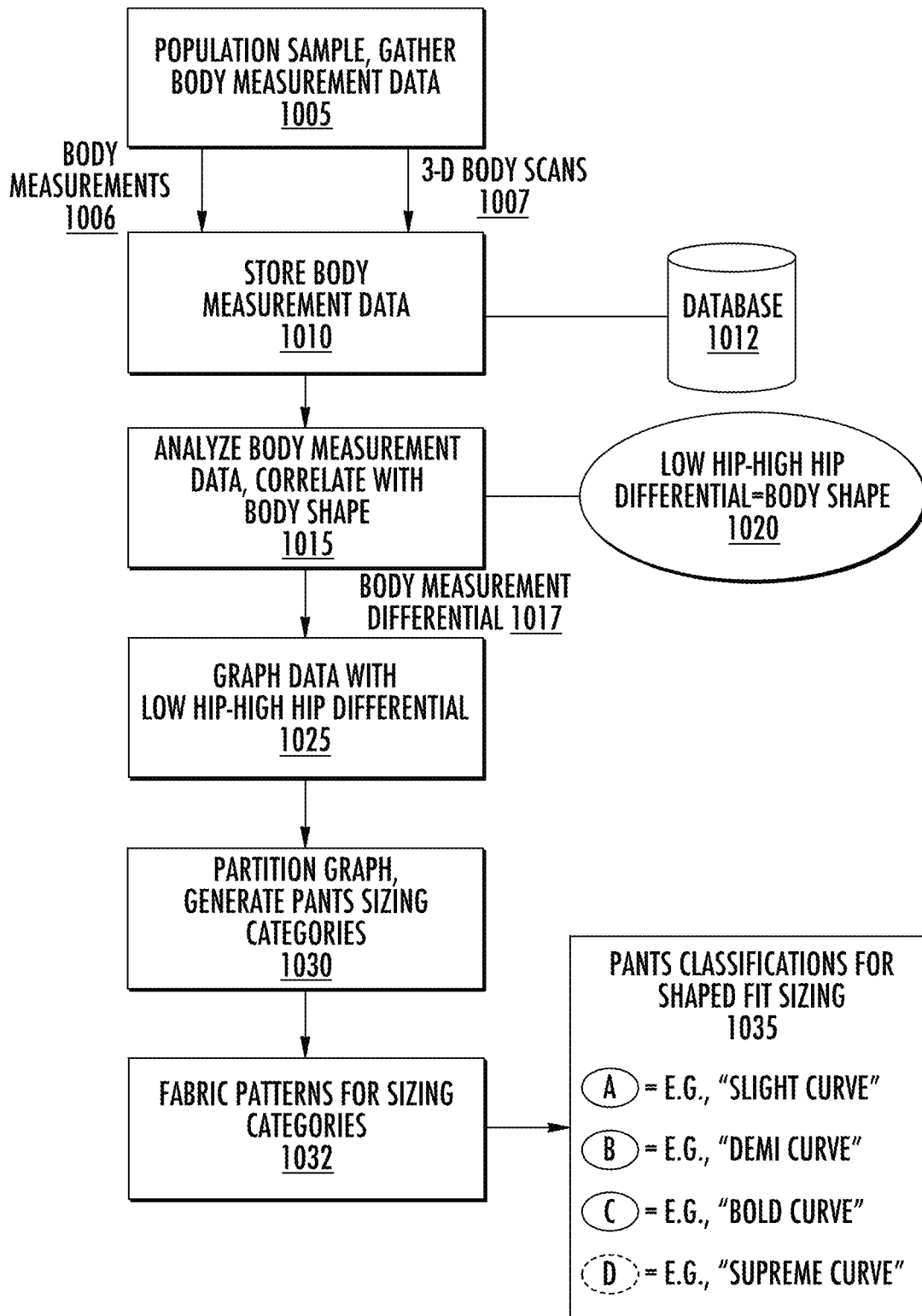
FIG. 10 shows a system of shaped fit sizing for pants. These pants include fashion jeans and shorts.
Figure 11:
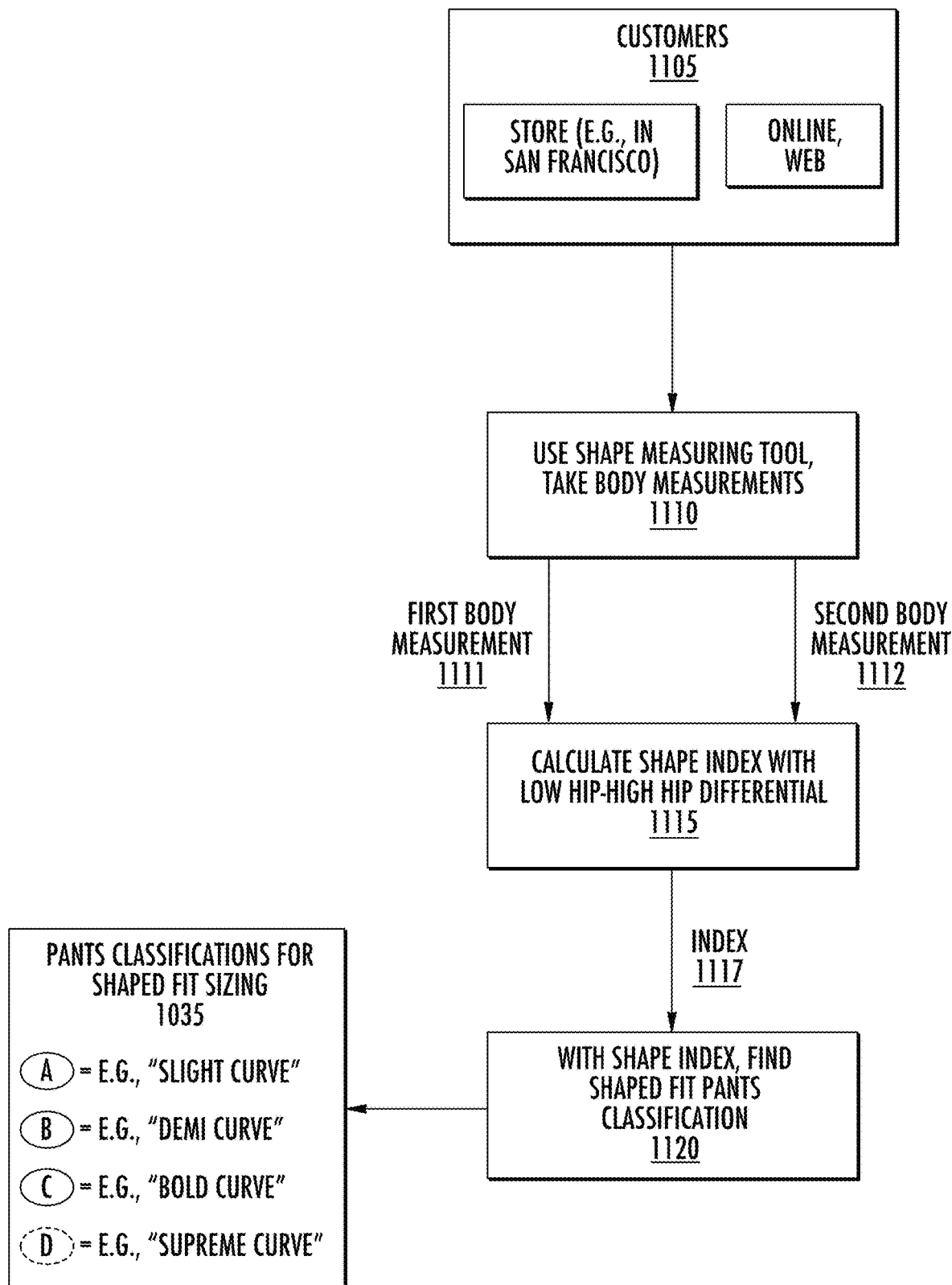
FIG. 11 shows a system for fitting a person to pants having shaped fit sizing.

To address the shortcomings of the previous sizing methodologies, another shaped sizing system for pants is described. FIG. 10 shows a block diagram of a system of shaped fit sizing for pants. FIG. 11 is a block diagram of a system for fitting a person to pants having shaped fit sizing.

Although the system is discussed with respect to pants, jeans, and shorts, the system can also be applied to other types of shaped fit clothing, especially those worn, at least in part, at and below the waist. These include dresses, skirts, slacks, formal wear (e.g., tuxedo trousers), school uniforms, military wear, athletic wear, sportswear (e.g., cycling wear, ski wear, golf wear, martial arts wear, track and field wear, swim wear, gymnastics wear, softball uniforms, baseball uniforms, football uniforms, hockey uniforms, lacrosse uniforms, winter and summer Olympics team apparel, gym wear, and others), dance wear, lingerie, panties, boxers, briefs, corsets, costumes (e.g., Halloween costumes or masquerade ball), and many others.

FIG. 10 shows a system of shaped fit sizing for pants. A shaped fit sizing system is targeted to specific consumers. For example, a specific target market for shaped fit is the U.S. women's market. Other markets may be in other geographic areas, such as Asia and Russia. The shaped fit sizing system can be tailored to specific markets and populations. This will ensure the shaped fit sizing system will have sizings to accommodate the great majority of the consumers and body types in those markets.

The system in FIG. 10 can achieve shaped fit sizing for pants for a targeted population. The system has components to generate metrics upon which to classify pants having shaped fit sizes. Components include: selecting a population sample and collecting body measurement data for this sample 1005. The collected body measurement data can include body measurements 1006 and digital body scans 1007. This measurement data 1010 can be stored in, for example, a database 1012, for subsequent analysis and correlation 1015. This analysis determines a body measurement differential 1017 upon which body shape can be based. In a specific implementation, the selected differential is a low hip to high hip differential 1020. The differential data is graphed 1025 and partitioned 1030, which forms the pants sizing categories or classifications 1030. Based on the determined sizing categories, fabric patterns 1032 are created. The fabric patterns are used to manufacture pants with the shaped fit sizing 1035.

In a specific implementation, there are three sizing categories 1035, which are identified as shaped fit sizings A, B, and C. The sizings can be referred to by other names. For example, for Curve ID, the names are slight, demi, and bold. Or the shaped fit sizings may be referred to using different colors.

In another specific implementation, there is an additional shaped fit sizing D. For Curve D, this sizing name is supreme. Shaped fit sizing D is optional and may not be available in every target market. Depending on the demographics of a target population, this additional shaped sizing can ensure that greater numbers (e.g., a greater percentage) of consumers will fit into the available shaped sizings. For example, in one marketplace, there may be people who do not fit size C, so they will need to buy size D clothes. However, in a different marketplace, there may not be any (or many) people who will fit size D, so size D clothes are not needed or sold there.

Target populations are typically divided geographically because clothing is usually sold on a geographical basis. So, there is a population of people where it is desirable to obtain shaped fit sizing for pants. Additionally, as desired to target the market and consumer better for better fit, this population may be divided by age, sex, ethnicity, or other parameters, or combinations of these.

For example, the population can be divided into geographic areas such as United States, Asia, and Russia. The population can include only females, girls and women. In other implementations, the population can include only males, boys and men. Generally, men and women have different shapes so they are considered in separate population studies. Alternatively, the population may include the entire world, and the population divided up subsequently after some analysis by the system. Based on how the population is divided or organized, separate or independent sizing systems can be developed for the respective population (e.g., girls and women, men and women, and women in the U.S. and women in China).

The actual population size of an entire market is enormously large. For example, for females in the United States, the population size is roughly 150 million; in Europe, roughly 450 million; and in China, roughly 500 million. It is impractical to make measurements of every individual in the population.

So instead, a sample (105) of the population is taken to reduce a number of measurements needed. Accurate results are desirable so the population sample should be sufficiently large to give good results which represent the entire population. In a specific implementation, for Curve ID, the population sample included over 60,000 women around the world.

Making measurements on the sample population sample can include setting up digital scanning booths at various locations (e.g., shopping mall and airports) and scanning the bodies of the individuals and storing 1010 each scan 1007 with measurements, along with other pertinent information, in a database 1012 (such as stored on a computer hard disk). Data can also be collected by recording manual measurements 1006 and saving these into database 1012. However, a digital scan of the body yields more information because a three-dimensional surface of the body will be recorded, not just some measurements at various points of the body (e.g., girth of waist).

With a body scan, any specific desired measurements can be made for that body scan (as if the person were actually present to take measurements). For example, not only will the girth of waist be available, the girth of waist at an offset 4 inches below the waist can be measured. Without the body scan, if the waist measurement were made manually, but the offset measurement was not made manually, then the offset measurement would not be available. The offset measurement might be estimated through a calculation, but this would generally not be as accurate as a measurement from the body scan.

In a specific implementation, the collected measurements 1010 include age, height, weight, and body dimensions such as girth measurements at specific points or locations on the body. Some or all the body scans may be collected by a third party. In a specific implementation, body scan collection centers have three-dimensional (3D) scanning equipment.

A three-dimensional scanner is a device that analyzes a real-world object (e.g., person or human being) to collect data on its shape. The collected data can then be used to construct digital, three-dimensional models. The three-dimensional scanner allows three-dimensional scans to be made based on the collected body measurement data.

These raw data measurements were stored in a database. The database can be read, accessed, analyzed, and processed by a computer system, which is hardware and software for processing and storing data.

FIG. 11 shows a system for fitting a person to pants having shaped fit sizing. Jeans with shaped fit sizing are available to consumers or customers 1105 through various channels. A channel for selling and making jeans available are stores. For example, Levi's Curve ID products are available at Levi retail stores (e.g., Market Street, San Francisco) or other retailers such as Macy's, J.C. Penny, and Kohl's (which may be referred to as wholesalers). A channel for selling and making jeans available on-line are Internet and Web sites.

A shape measuring tool 1110 is used to fit the consumer. In a store, a salesperson can use the shape measurement tool to measure the consumer, and find which of the shaped fit sizing categories (e.g., A, B, or C) the consumer falls within. Two girth measurements 1111 and 1112 are made. A calculation 1115 is made that indicates a shape index 1117. With the shape index, the consumer will be able to determine their shaped fit pants classification or category 1120. The consumer can choose the jeans 1035 with the appropriate shaped fit sizing.

Figure 12:
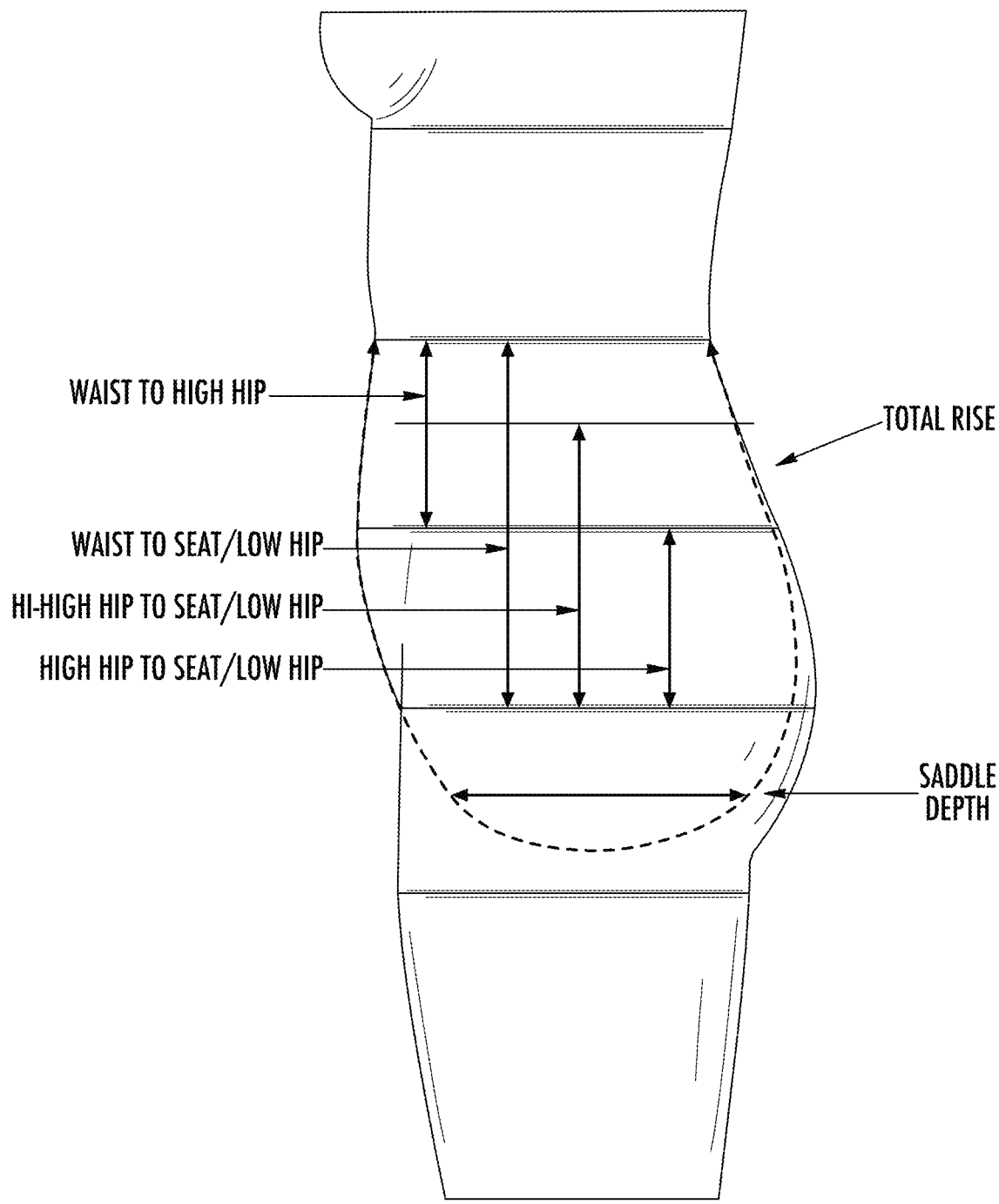
FIG. 12 shows some points at which differential girth body measurements can be measured on a person. These differential girth body measurements can be used as an indication of depth and shape of a person.

FIG. 12 shows some points at which differential girth body measurements can be measured on a person. These differential girth body measurements can be used as an indication of width, depth, and shape of a person. These differentials include the natural waist to high hip, natural waist to seat (or low hip), hi-high hip to seat, and high hip to seat. A differential is a difference between two lower body parameters. Other measurements include total rise and saddle depth. Any or all these differential measurements may be included in the body scan data, or calculated from the body scan data.

The differentials in FIG. 12 are in reference to the natural waist described above. The high hip is located about 4 inches (or about 10.2 centimeters) below the natural waist. The seat or low hip is typically located about 4 inches below the high hip or about 8 inches (or about 20.3 centimeters) below the natural waist.

Returning to FIG. 10, the collected body measurement data is analyzed 1015 to determine which of the numerous measurements taken and available correspond to body shape, and can be used as a basis for shaped fit sizing pants. FIG. 12 shows four differential body measurements. There are many combinations of measurements to consider. These and other measurement points (not indicated) were considered.

The analysis, including statistical and mathematical calculations, found the low hip (or seat) to high hip differential correlates highly with body shape. The other differentials listed in FIG. 4 also correlate to body shape, but the low hip-high hip differential was selected. In alternative implementations, the shaped fit sizing system can use any of the other differentials—natural waist to high hip, natural waist to low hip, or hi-high hip to low hip.

To analyze the data and generate the charts, the components or subcomponents of the analysis and correlation component can include and be performed by a computer system. The computer system can include, for example, a computer screen to electronically display the graphs and charts. The computer system can include software programs stored in computer memory for performing (via a computer processor) the statistical analyses.

In a specific implementation, the result or output of analysis 1015 is the identification of low hip-high hip differential 1020 as indicative of body shape or body geometry. The low hip-high hip differential is used in Curve ID, where low hip is measured 8 inches from the natural waist and high hip is measured 4 inches from the natural waist. The differential may also be referred to as a shape index. Other names can be used.

For Curve ID, a difference between the high hip and low hip measurement is about 4 inches (i.e., 8 inches minus 4 inches). For shaped fit sizing system, the difference between the two body measurement points can vary. However, better accuracy and fit can be obtained when the body point differences is greater than about 3 inches. The body point differences can even be greater than the 4 inches used for Curve ID. Generally, smaller differences such as 0.5 inches or 1 inches of difference in the body points may not give as accurate a measure of body shape.

The selected body measurement differential 1017 for the target population is analyzed 1025. The analysis can include graphing the differential amounts for the target population to see a distribution of body shape.

Figure 13:
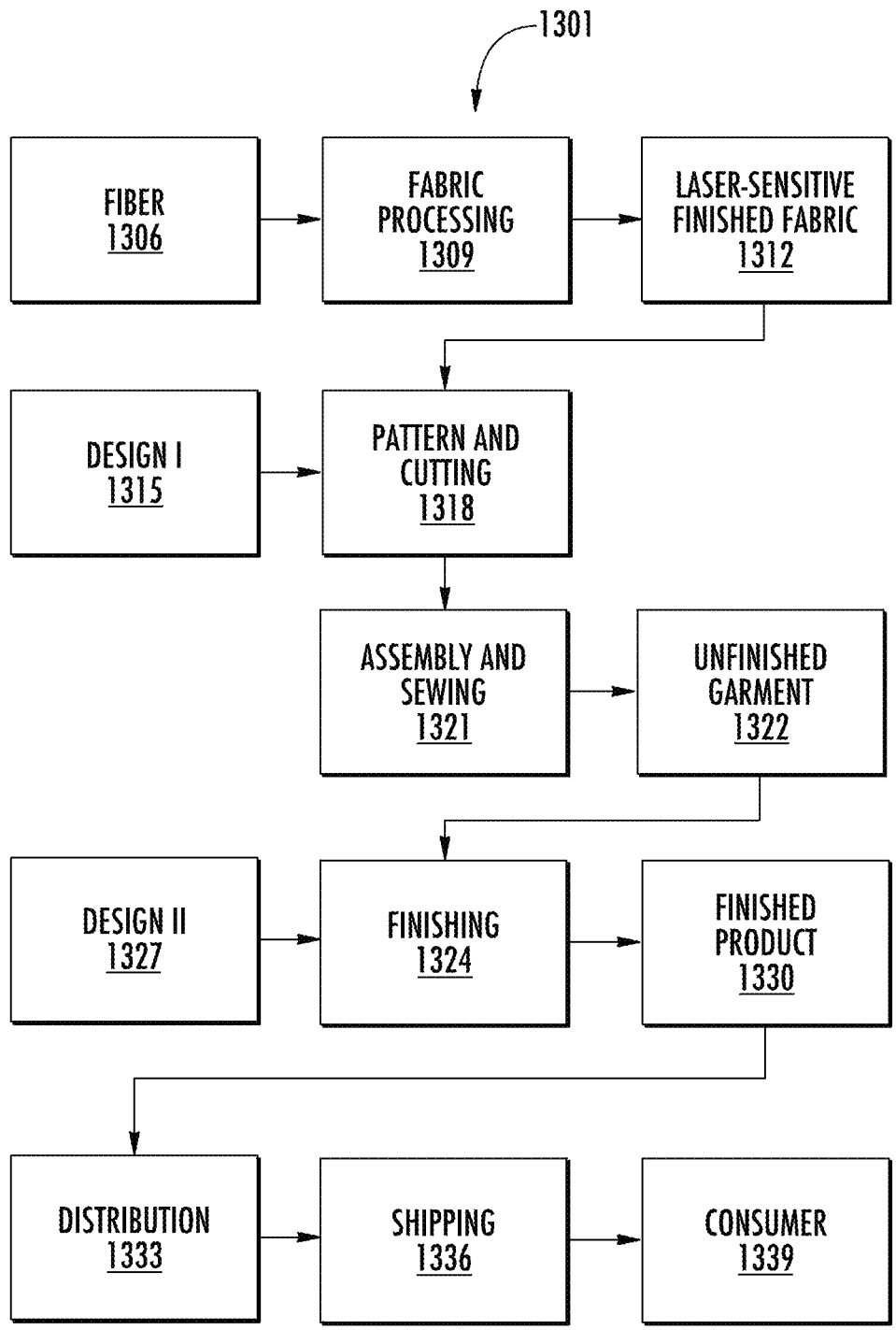
FIG. 13 shows a flow diagram for creating, designing, producing apparel products with laser finishing.

FIG. 13 shows a process flow 1301 for manufacturing apparel such as jeans, where garments are finished using a laser. This flow can be part of manufacturing component 128 of the on-demand manufacturing of laser-finished apparel. The fabric or material for various apparel including jeans is made from natural or synthetic fibers 1306, or a combination of these. A fabric mill takes fibers and processes 1309 these fibers to produce a laser-sensitive finished fabric 1312, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandex), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including non-denim products and products made from knit materials. Some examples include T-shirts, khakis, sweaters, coats, sweatshirts (e.g., hoodies), casual wear, athletic wear, outerwear, dresses, evening wear, sleepwear, loungewear, underwear, socks, bags, backpacks, uniforms, umbrellas, swimwear, bed sheets, scarves, and many others.

A manufacturer creates a design 1315 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 1318 based on the design. The pattern pieces are assembled together 1321 into the garment, typically by sewing, but can be joined together using other techniques (e.g., rivets, buttons, zipper, hoop and loop, adhesives, or other techniques and structures to join fabrics and materials together). The patterning, cutting, assembly, or sewing, or any combination of these, can be by an automated process controlled by the apparel management system.

Some garments can be complete after assembly and ready for sale. However, other garments are unfinished 1322 and have additional finishing 1324, which includes laser finishing. The finishing may include tinting, washing, softening, and fixing. For distressed denim products, the finishing can include using a laser to produce a wear pattern according to a design 1327 (design II). Some additional details of laser finishing are described in U.S. patent application 62/377, 447, filed Aug. 19, 2016, and Ser. No. 15/682,507, filed Aug. 21, 2017, are incorporated by reference along with all other references cited in this application.

Further, U.S. patent application Ser. Nos. 16/177,287 and 16/177,293, filed Oct. 31, 2018, 62/806,713, filed Feb. 15, 2019, 62/636,108 and 62/636,112, filed Feb. 27, 2018, Ser. No. 15/682,507, filed Aug. 21, 2017, Ser. Nos. 15/841,263 and 15/841,268, filed Dec. 13, 2017, 62/579,863 and 62/579, 867, filed Oct. 31, 2017, and Ser. No. 12/917,887, filed Nov. 2, 2010 are incorporated by reference.

Design 1327 is for postassembly aspects of a garment while design 1315 is for preassembly aspects of a garment. After finishing, a finished product 1330 (e.g., a pair of jeans) is complete and ready for shipment and delivery to the consumer. The consumer can buy and wear worn blue jeans without having to wear out the jeans themselves, which usually takes significant time and effort.

In other implementations, the finished product is ready for sale at retail locations. The finished product is inventoried and distributed 1333, delivered to stores 1336, and sold to consumers or customers 1339.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use of agents such as potassium permanganate and pumice. An alternative to these traditional finishing approaches is laser finishing.

Figure 14:
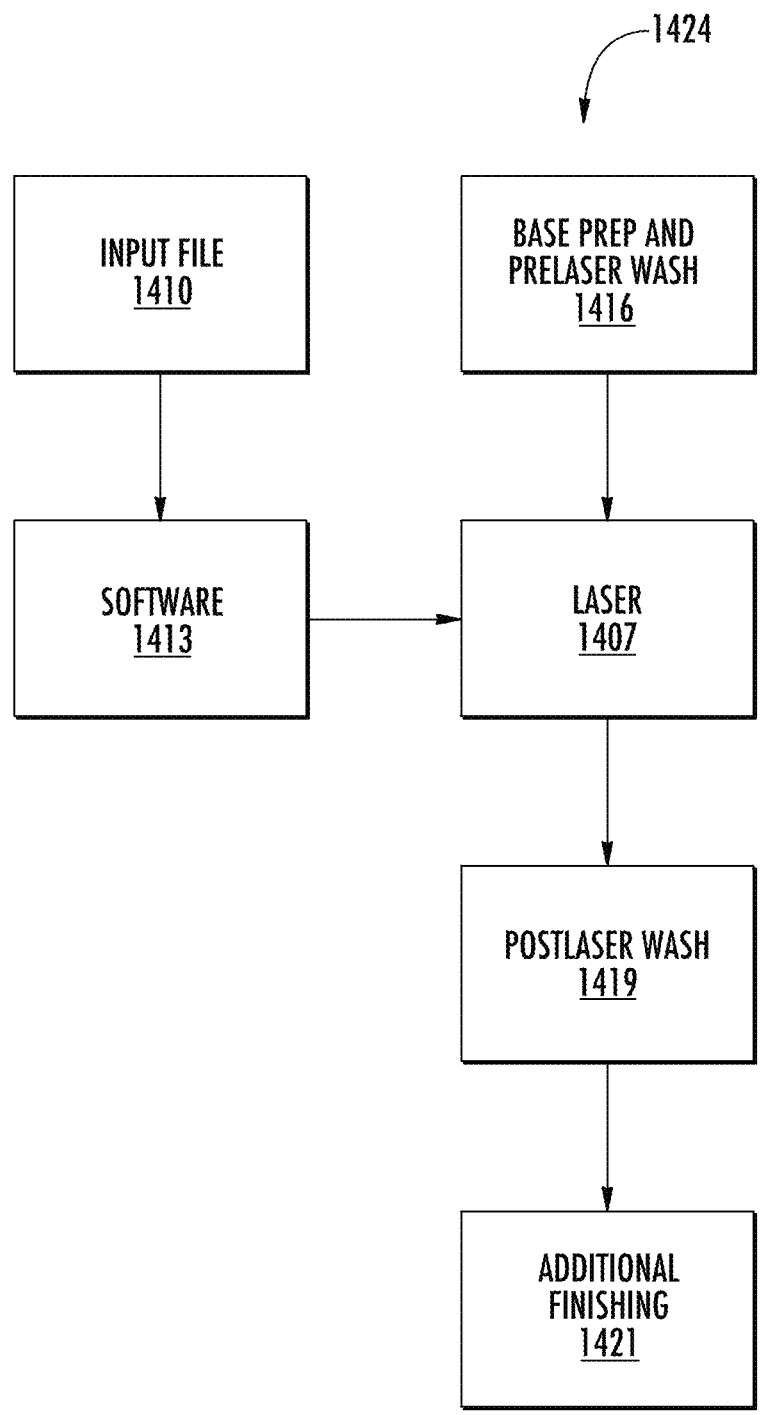
FIG. 14 shows a flow for a finishing technique that includes the use of a laser.

FIG. 14 shows a finishing technique that includes the use of a laser 1407. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser is controlled by an input file 1410 and control software 1413 to emit a laser beam onto fabric at a particular position or location at a specific power level for a specific amount of time. Further, the power of the laser beam can be varied according to a waveform such as a pulse wave with a particular frequency, period, pulse width, or other characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by input file 1410) onto the garment. The fabric that is exposed to the laser beam (e.g., infrared beam) changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers have more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

Jeans are dyed using an indigo dye, which results in a blue colored fabric. The blue color is caused by chromophores trapped in the fabric which reflect light as a blue color. U.S. patent applications 62/433,739, filed Dec. 13, 2016, and Ser. No. 15/841,263, filed Dec. 13, 2017, which are incorporated by reference, describe a denim material with enhanced response characteristics to laser finishing. Using a denim material made from indigo ring-dyed yarn, variations in highs and lows in indigo color shading is achieved by using a laser.

Laser finishing can be used on denim and also other materials too. Laser finishing can be used to alter the coloration of any material where the sublimation (or decomposition in some cases) temperature of the dye or the material itself is within range of the operating temperatures of the laser during use. Color change is a product of either the removal of dyestuff or the removal of material uncovering material of another color.

Figure 15:
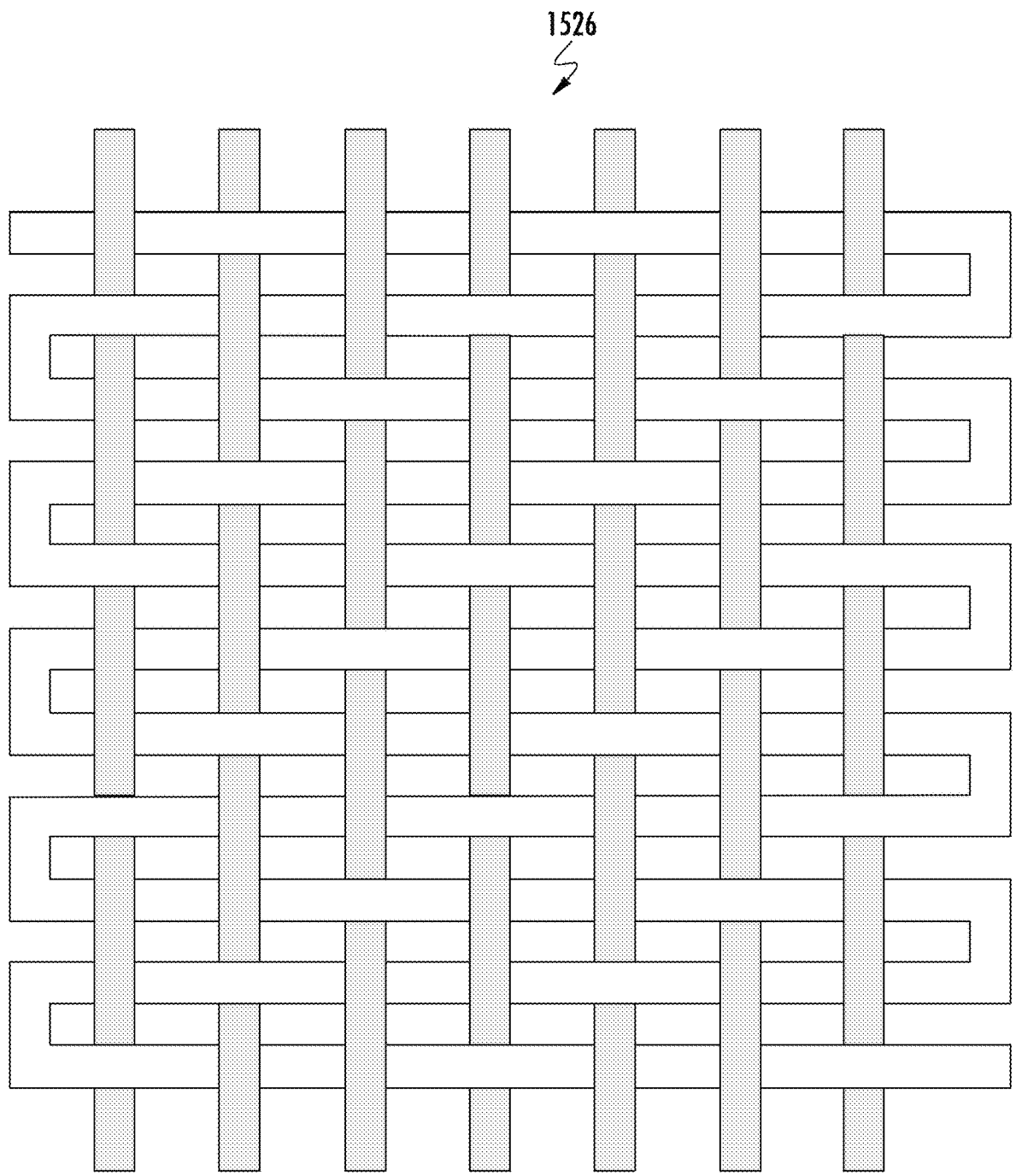
FIG. 15 shows a weave pattern for a denim fabric.

FIG. 15 shows a weave pattern of a denim fabric 1526. A loom does the weaving. In weaving, warp is the lengthwise or longitudinal yarn or thread in a roll, while weft or woof is the transverse thread. The weft yarn is drawn through the warp yarns to create the fabric. In FIG. 15, the warps extend in a first direction 1535 (e.g., north and south) while the wefts extend in a direction 1537 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 15 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from an lower right to an upper left. But in other denim weaves, the weft can pass under a different number of warp threads, such as 3, 4, 5, 6, 7, 8, or more. In other implementation, the denim is a 3×1 right-hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So when the yarn is viewed cross-sectionally, the indigo dyed material will appear as a ring on around an outer edge of the yarn. The shading of the indigo dye will generally lighten in a gradient as a distance increases from the surface of the yarn to the center (or core) of the yarn.

During laser finishing, the laser removes a selected amount of the surface of the indigo dyed yarn (e.g., blue color) to reveal a lighter color (e.g., white color) of the inner core of the ring-dyed yarn. The removal of the material can be by burning or oxidation or by ablation. The more of the indigo dyed material that is removed, the lighter the color (e.g., lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed or burned via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

FIGS. 16-19 show how the laser alters the color of ring-dyed yarn. FIG. 16 shows a laser beam 1607 striking a ring-dyed yarn 1613 having indigo-dyed fibers 1618 and white core fibers 1622. The laser removes the dyed fibers, which can be by vaporizing or otherwise destroying the cotton fiber via heat or high temperature that the laser beam causes.

Although this patent describes burning of a pattern by laser, the actual chemical or physical process of the laser may include burning or oxidation, ablation, sublimation, or decomposition of the dyestuff itself or the material incorporating the dyestuff, or any combination of these. The terms printing, marking, or burning are used to refer to any of the chemical or physical processes by which the laser removes dyestuff from the material.

FIG. 17 shows the laser using a first power level setting or first exposure time setting, or a combination of these, to remove some of the dyed fibers, but not revealing any of the white core fibers. The undyed fibers remain covered. There is no color change.

FIG. 18 shows the laser using a second power level setting or second exposure time setting, or a combination of these, to remove more of the dyed fibers than in FIG. 17. The second power level is greater than the first power level, or the second exposure time setting is greater than the first exposure time setting, or a combination of these. The result is some of the undyed fibers are revealed. There is a color change, subtle highlighting.

FIG. 19 shows the laser using a third power level setting or third exposure time setting, or a combination of these, to remove even more of the dyed fibers than in FIG. 18. The third power level is greater than the second power level, or the third exposure time setting is greater than the second exposure time setting, or a combination of these. The result is more of the undyed fibers are revealed. There is a color change, brighter highlighting.

As shown in FIG. 14, before laser 1407, the fabric can be prepared 1416 for the laser, which may be referred to as a base preparation, and can include a prelaser wash. This step helps improves the results of the laser. After the laser, there can be a postlaser wash 1419. This wash can clean or remove any residue caused by the laser, such as removing any charring (which would appear as brown or slightly burning). A dryer will dry the garment after wash. There can be additional finish 1421, which may be including tinting, softening, or fixing, to complete finishing.

After laser finishing a garment, the garment can be tagged for tracking through the remainder of the processing, which identifies it as part of a customer's order. For example, after laser finishing, the garment can be tagged with a washable tag using a tag gun. This tagging may be by a tag printed with text or a bar code, or both, radio-frequency identification (RFID) tag, laser marking on garment to uniquely identify garment with order, or others, or any combination. The garments can be washed with the tags in the postlaser wash, so that the garments can be identified again after washing and drying.

Further, after lasering, the garments can be grouped together based on the appropriate postlaser wash and additional finishing treatments for that garment. Then multiple garments that go through the same postlaser wash and additional finishing treatments will be washed together as a group.

Figure 20:
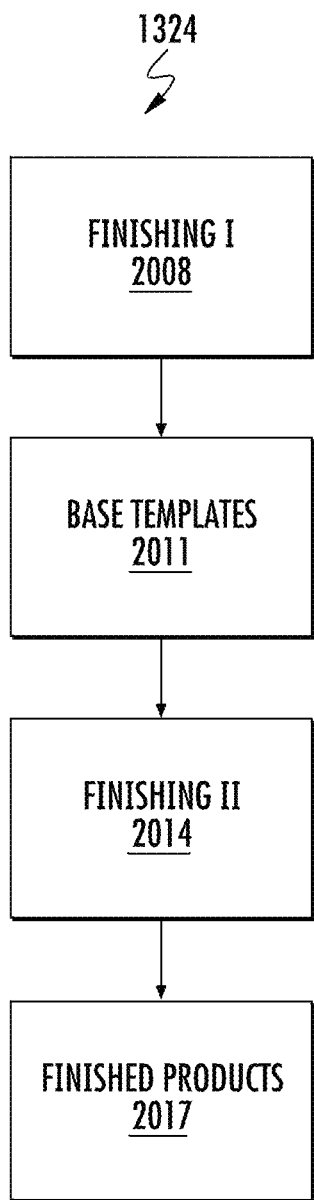
FIG. 20 shows a flow for finishing in two finishing steps and using base templates.

FIG. 20 shows a technique where finishing 1324 is divided into two finishing steps, finishing I and finishing II. Finishing I 2008 is an initial finishing to create base templates 2011. With finishing II 2014, each base template can be used to manufacture multiple final finishes 2017.

Figure 21:
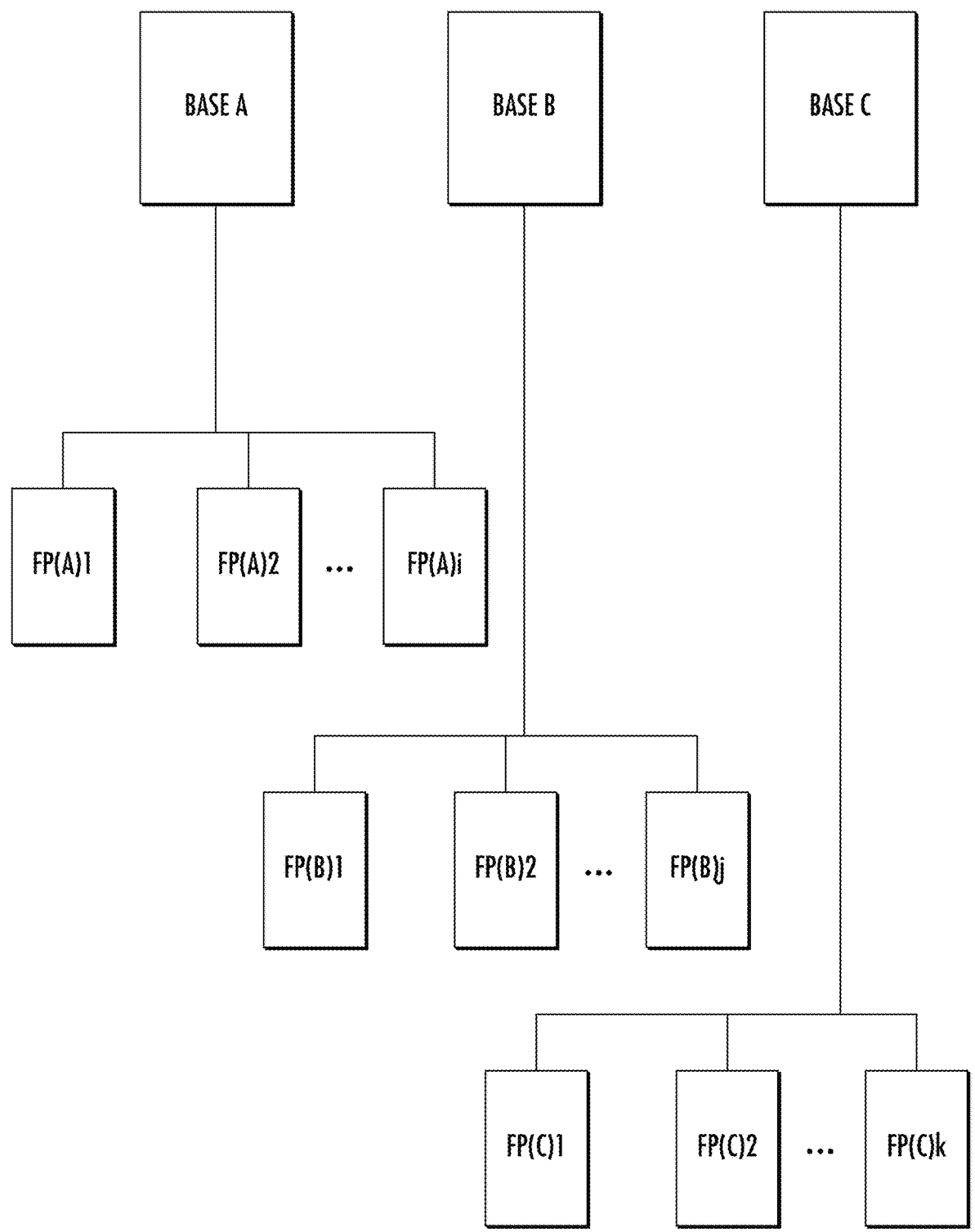
FIG. 21 shows multiple base templates and multiple resulting finished products from each of these templates.

FIG. 21 shows multiple base templates, base A, base B, and base C. These base templates may be referred to as base fit fabrics or BFFs. In an implementation, the base templates can be created during base prep and prelaser wash 1416 (see FIG. 14). During finishing I, by using different wash 1416 methods or recipes, each different base template can be created.

Finishing II can include laser finishing. Base A is lasered with different designs to obtain various final product based on base A (e.g., FP(A)1 to FP(A)i, where i is an integer). Base B is lasered with different designs to obtain various final product based on base B (e.g., FP(B)1 to FP(B)j, where j is an integer). Base C is lasered with different designs to obtain various final product based on base C (e.g., FP(C)1 to FP(C)k, where k is an integer). Each base can be used to obtain a number of different final designs. For example, the integers i, j, and k can have different values.

As described above and shown in FIG. 14, after finishing II, there can be additional finishing during postlaser wash 1419 and additional finishing 1421. For example, during the postlaser wash, there may be additional tinting to the lasered garments. This tinting can result in an overall color cast to change the look of the garment.

In an implementation, laser finishing is used to create many different finishes (each a different product) easily and quickly from the same fabric template or BFF or "blank." For each fabric, there will be a number of base fit fabrics. These base fit fabrics are lasered to produce many different finishes, each being a different product for a product line. Laser finishing allows greater efficiency because by using fabric templates (or base fit fabrics), a single fabric or material can be used to create many different products for a product line, more than is possible with traditional processing. This reduces the inventory of different fabric and finish raw materials.

For a particular product (e.g., 511 product), there can be two different fabrics, such as base B and base C of FIG. 9. The fabrics can be part of a fabric tool kit. For base B, there are multiple base fit fabrics, FP(B)1, FP(B)2, and so forth. Using laser finishing, a base fit fabric (e.g., FP(B)1) can be used to product any number of different finishes (e.g., eight different finishes), each of which would be considered a different product model.

For example, FP(B)1 can be laser finished using different laser files (e.g., laser file 1, laser file 2, laser file 3, or others) or have different postlaser wash (e.g., postlaser wash recipe 1, postlaser wash recipe 2, postlaser wash recipe 3, or others), or any combination of these. A first product would be base fit fabric FP(B)1 lasered using laser file 1 and washed using postlaser wash recipe 1. A second product would be base fit fabric FP(B)1 lasered using laser file 2 and washed using postlaser wash recipe 1. A third product would be base fit fabric FP(B)1 lasered using laser file 2 and washed using postlaser wash recipe 2. And there can be many more products based on the same base fit fabric. Each can have a different product identifier or unique identifier, such as a different PC9 or nine-digit product code.

With laser finishing, many products or PC9s are produced for each base fit fabric or blank. Compared to traditional processing, this is a significant improvement in providing greater numbers of different products with less different fabrics and finishes (each of which in traditional processing consume resources, increasing cost, and take time). Inventory is reduced. The technique of providing base fit finishes or fabric templates for laser finishing has significant and many benefits.

Figure 22:
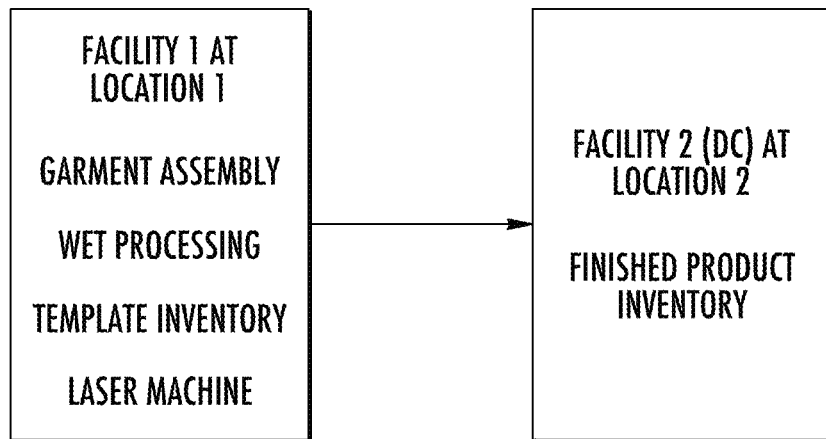
FIGS. 22-24 show various approaches for staging the base fit fabrics or base templates.
Figure 23:
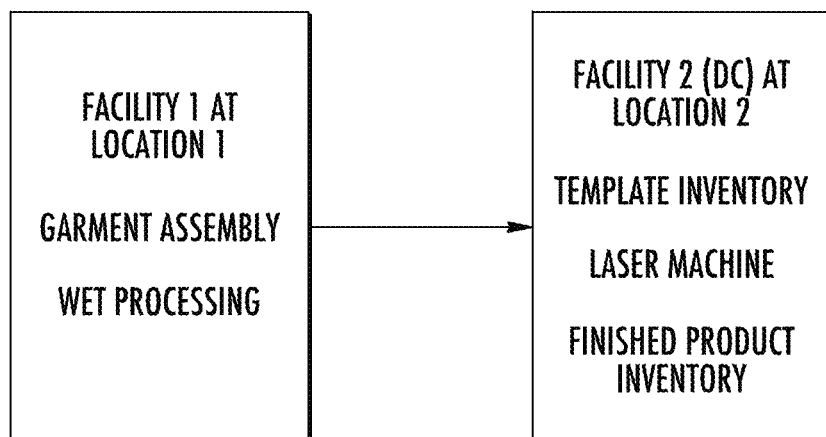
Figure 24:
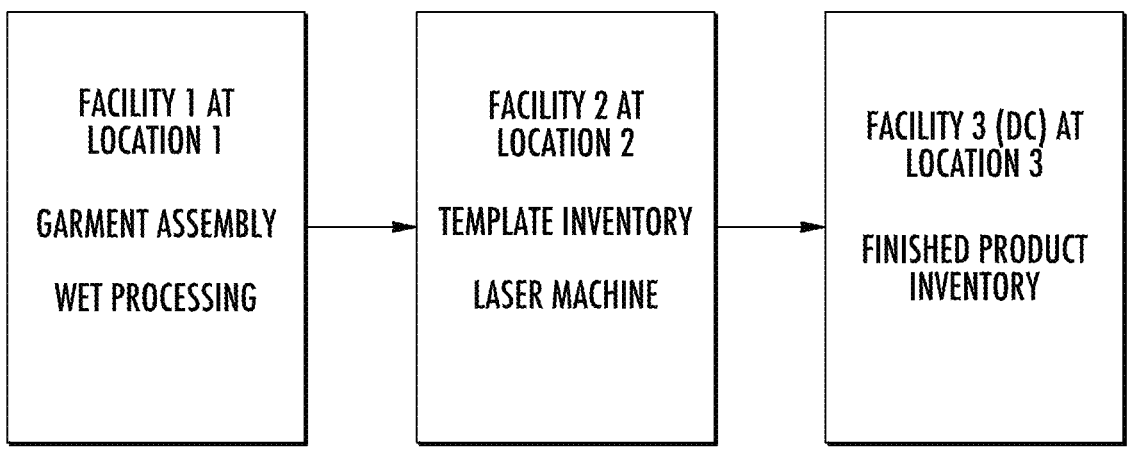

FIGS. 22-24 show various approaches for staging (e.g., storing inventory) the base fit fabrics or base templates. In FIG. 22, there is a first facility at a first location and a second facility at a second location, different from each other (in different buildings). The second facility may be referred to as a distribution center and stores an inventory of the finished products. As an example, the first facility can be in China or Asia. The second facility can be in the United States (e.g., distribution center for the U.S. market).

The first facility is handles assembling the garments, wet processing (e.g., base wash), storing an inventory of the base templates, lasering of the garment by a laser finishing machine when needed. The finished product, output from the laser machine, is shipped to the second facility for inventorying.

In FIG. 23, compared to the approach in FIG. 22, the first facility no longer stores the blank template inventory, but ships the templates after base wash to the second facility. The second facility stores an inventory of the base templates, and has laser machines that can laser finish the garments. The resulting finished products are also inventoried at the second facility. In this approach, the time from finished product to store is shortened (compared to the approach in FIG. 21) because typically the second facility (e.g., distribution center) is closer to, for example, the retail stores and location of the purchasers. This approach may be considered in-market final finishing because laser finishing occurs in the same location as the market the facility serves.

In FIG. 24, compared to the approaches in FIGS. 22 and 23, there are three facilities. The third facility is a distribution center (similar to the second facilities in FIGS. 22 and 23) and stores the finished products. The second facility handles storing inventory of the base templates and lasering of the garments. The first facility handles assembling the garments and base wash. The first facility ships the base templates to the second facility, which inventories them. After lasering, the second facility ships the finished products to the third facility.

As an example, the first facility can be in China or Asia. The second facility can be in Mexico, or other location geographically closer to the third facility than the first facility. The third facility can be in the United States (e.g., distribution center for the U.S. market).

Figure 25:
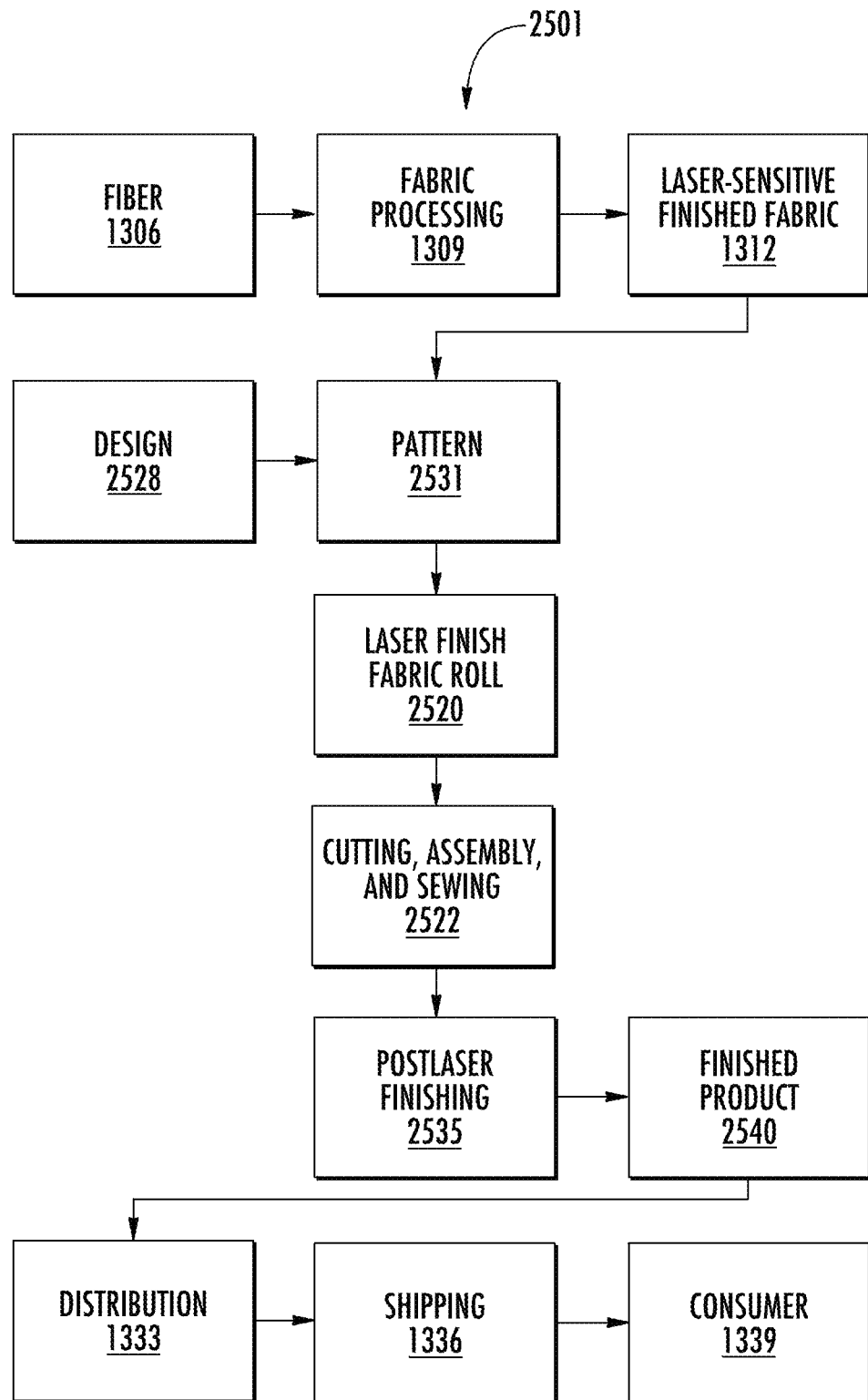
FIG. 25 shows another flow diagram for creating, designing, producing apparel products with laser finishing.
Figure 28:
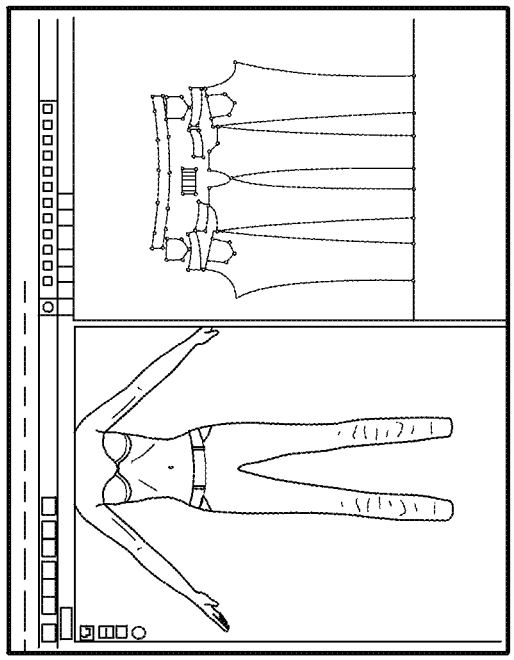
FIGS. 26-29 show a design process for jeans.
Figure 29:
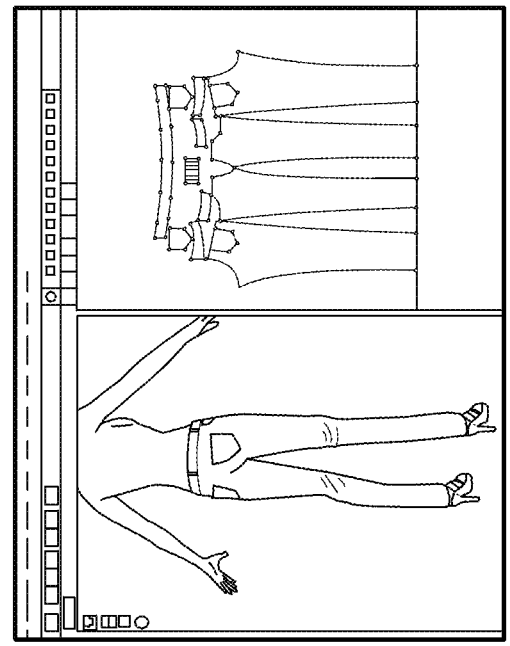
Figure 26:
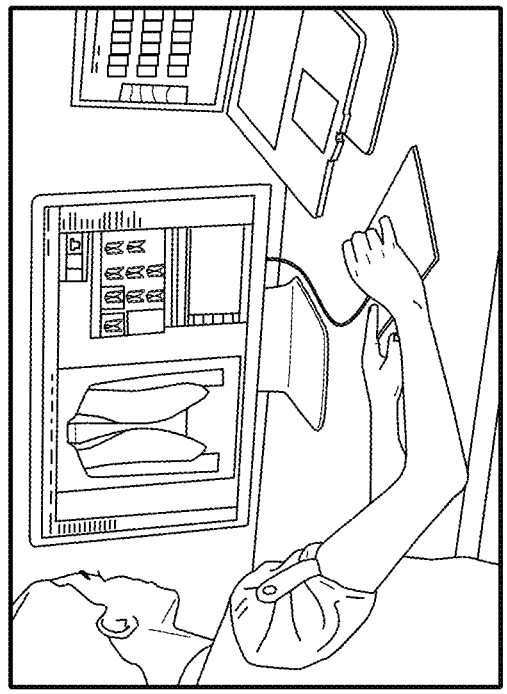
Figure 27:
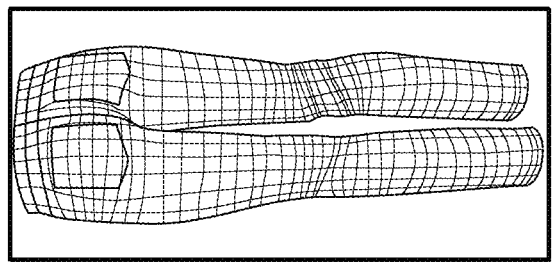

FIG. 25 shows another flow diagram for creating, designing, producing apparel products with laser finishing. This flow can be part of manufacturing component 128 of the on-demand manufacturing of laser-finished apparel. Compared to flow 1301 of FIG. 13, in this flow 2501, a laser finishing 2520 is performed on the fabric rolls or sheets before cutting, assembly, and sewing of the garment 2522. Fiber 1306, fabric processing 1309, laser-sensitive finished fabric 1312, distribution 1333, shipping 1336, and consumer 1339 are similar to that described above for flow 1301 above.

In a design 2528, the manufacturer creates the design of its products, similar to that described for design 1315 above. Further, design 2528 includes designing a finishing pattern 2531 for the garment product, similar to discussed for design 1327 above. The finishing patterns are for panels of a garment, before assembly, and are stored in one or more laser input files. A laser 2520 takes uses laser input files and burns or marks the finishing pattern onto fabric panels on a fabric rolls or sheets.

Then the fabric panels are cut 2522. The panels are sorted and assembled or aligned with each other so the finishing patterns of the different panels mate with each other properly. Then the panels are sewn together to form the garment. There can be a postlaser finishing 2535, such as a postlaser wash 1419 and additional finishing 1421, described above. Then, a finished garment 2540 is complete and ready for shipment and delivery to the consumer.

A jeans manufacturing process flow can include design, prototype, pattern making, marker making, cutting, sewing, and finishing. Each aspect of the flow can be controlled by apparel management system 122.

FIGS. 26-29 show a design process for jeans. For design, a designer designs a jeans concept showing desired constructions. Software tools are used to design a pair of jeans. The tools show a desired construction and aesthetic. The software used may show a three-dimensional view of the garment.

Figure 30:
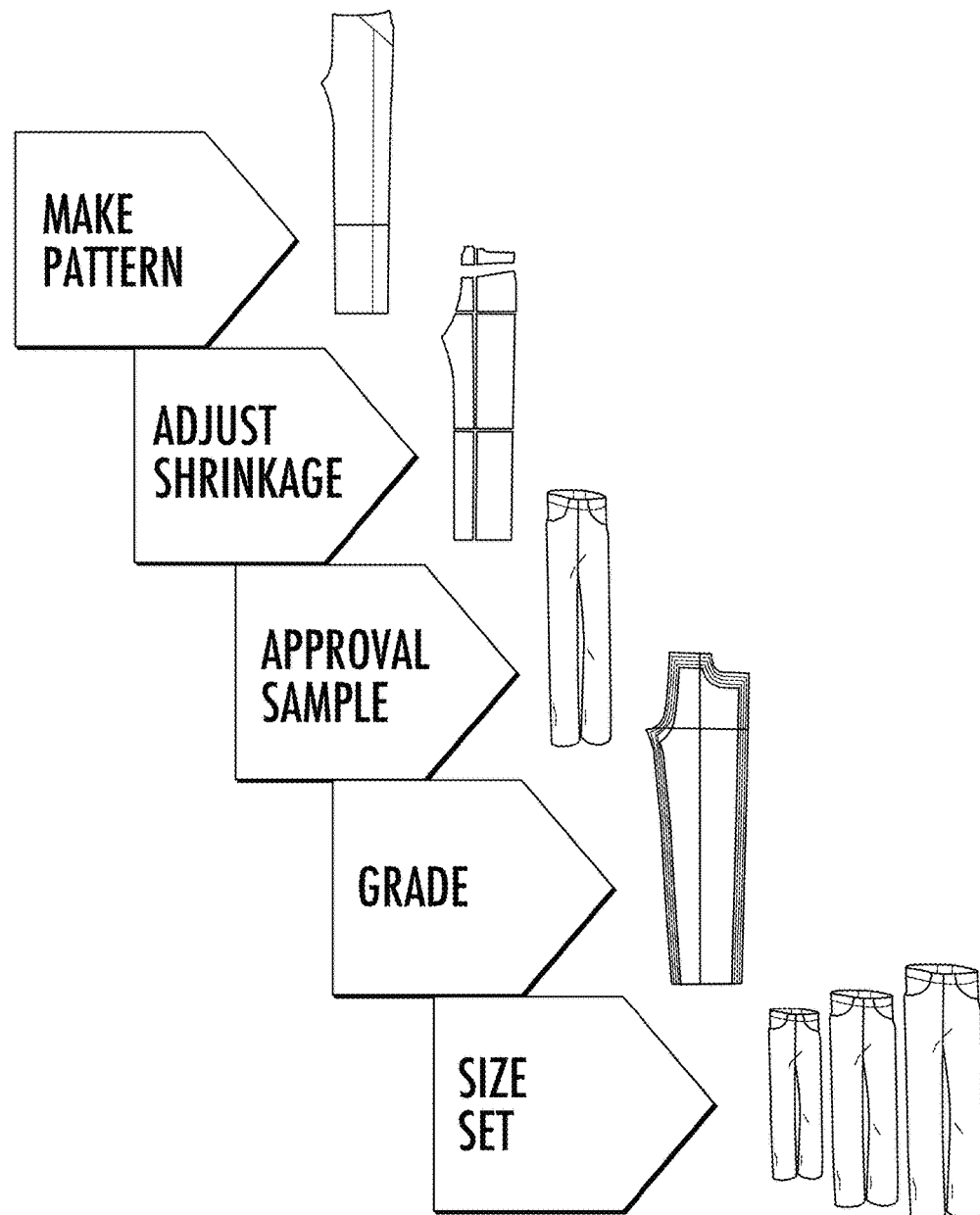
FIG. 30-31 show a prototype process for jeans.
Figure 31:
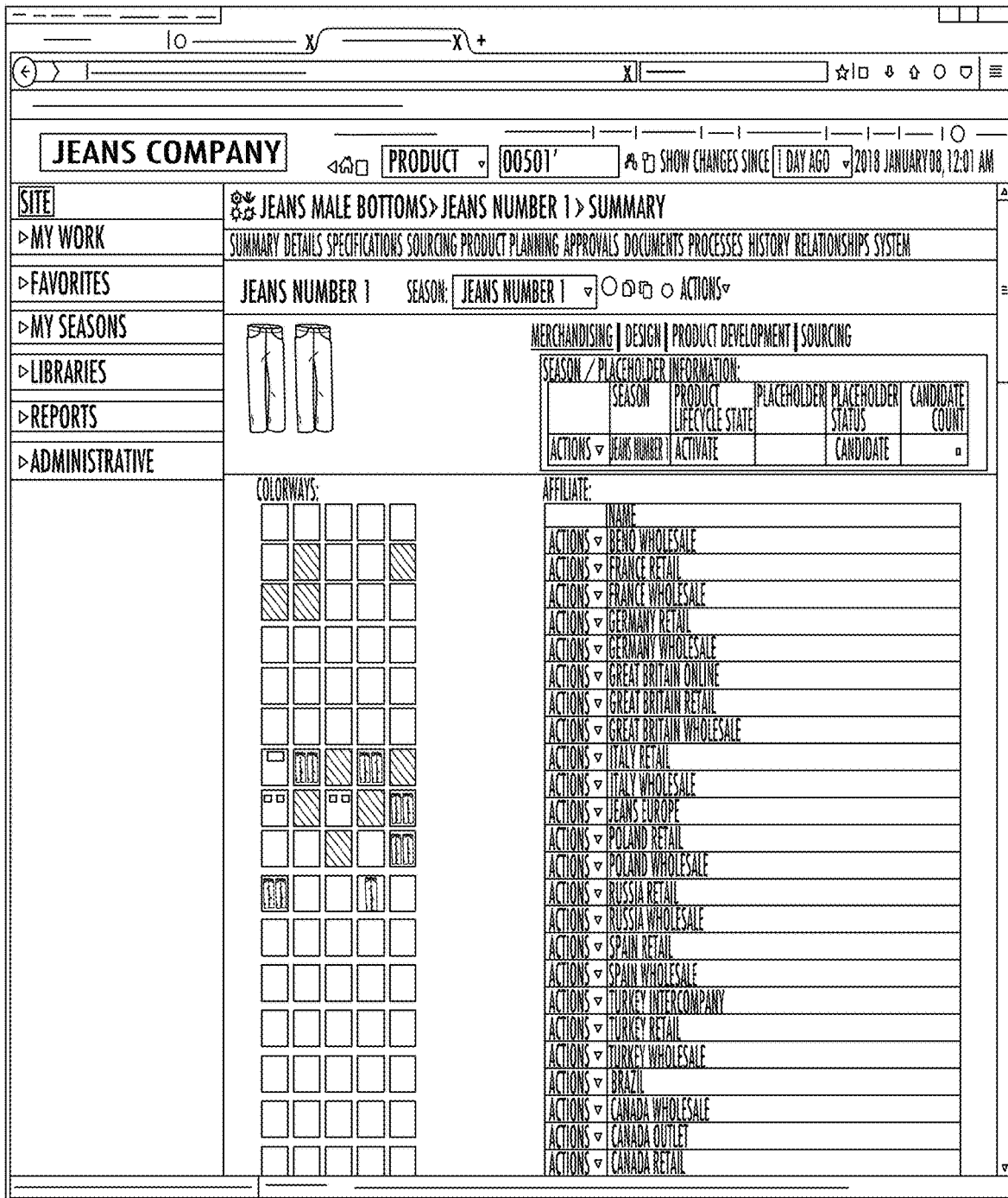

FIG. 30-31 show a prototype process for jeans. A product developer translates the concept to an initial manpack (e.g., fit-measurement, construction, and finish) to run a prototype in base size. Designer analyzes prototype and makes final adjustments. This process can be done entirely by software, where no physical prototype is produced or needed.

Figure 32:
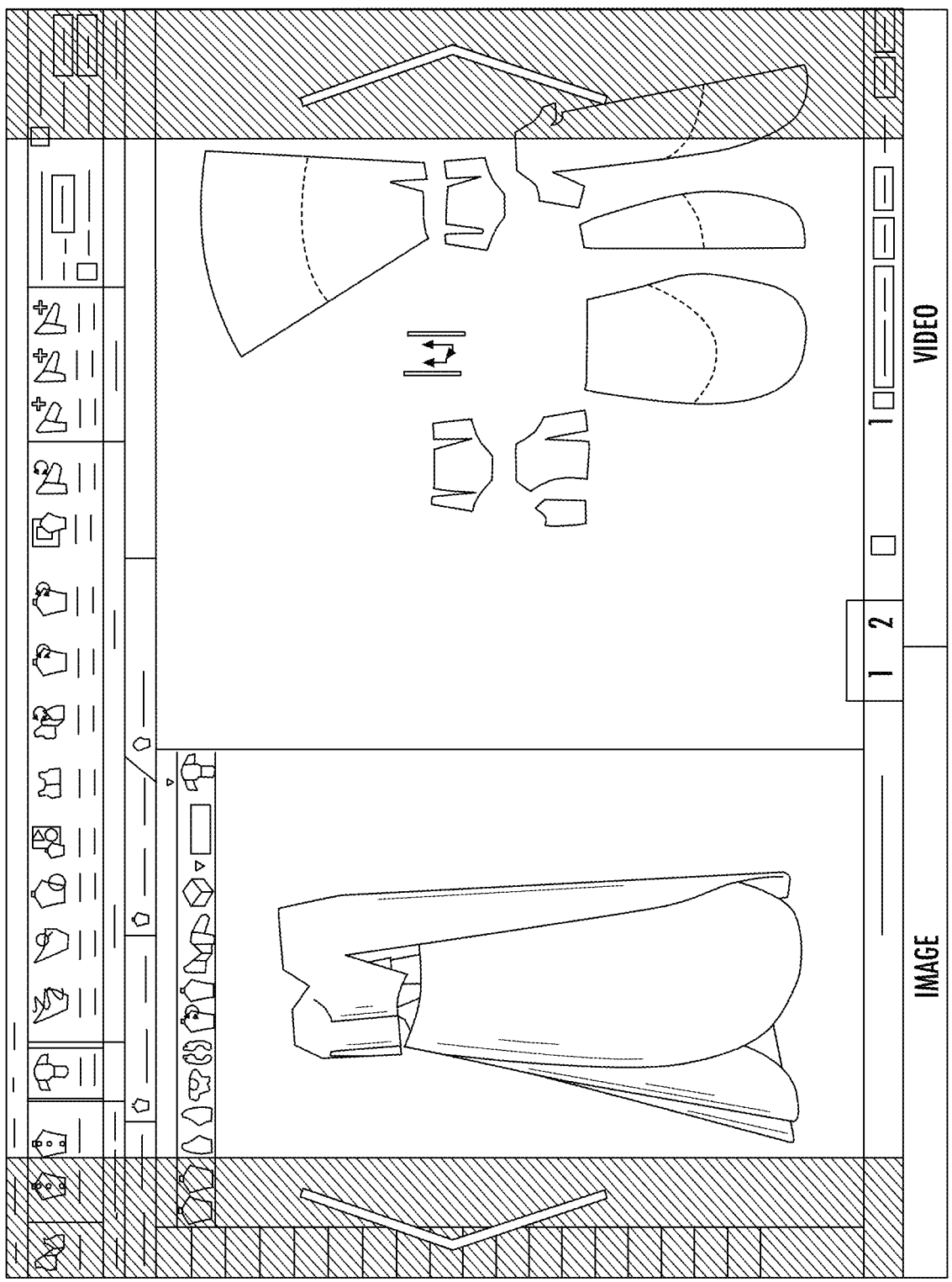
FIGS. 32-34 show a pattern making process.
Figure 34:
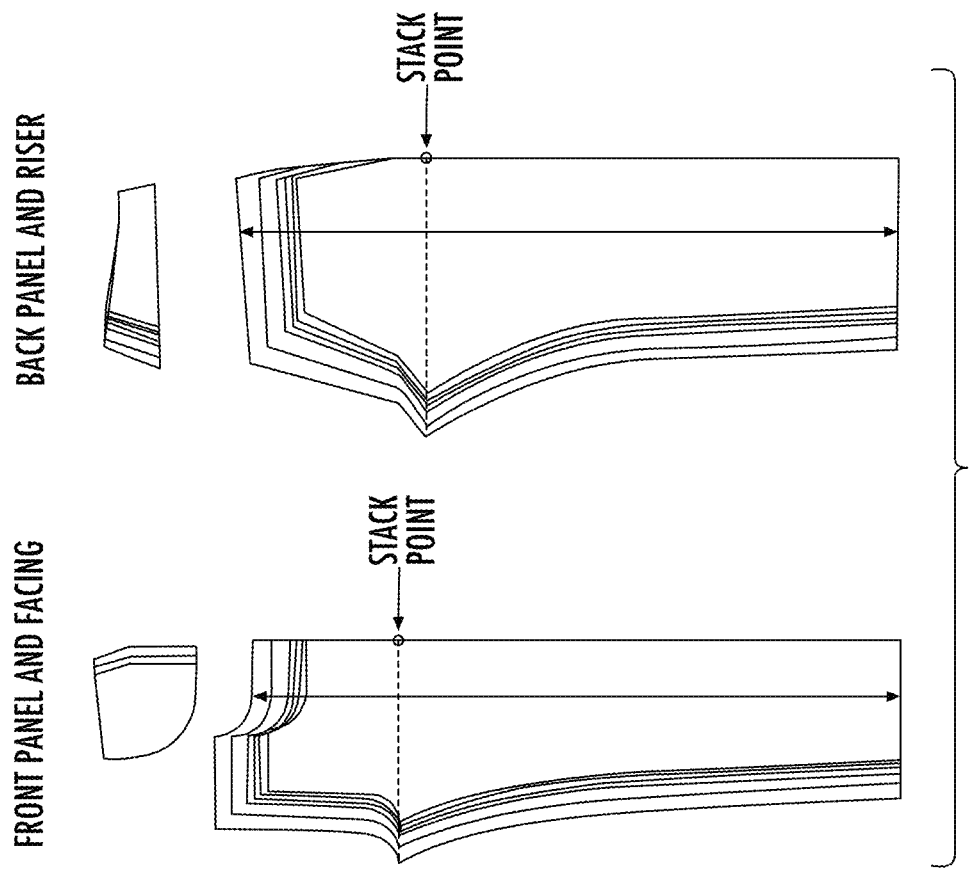
Figure 33:
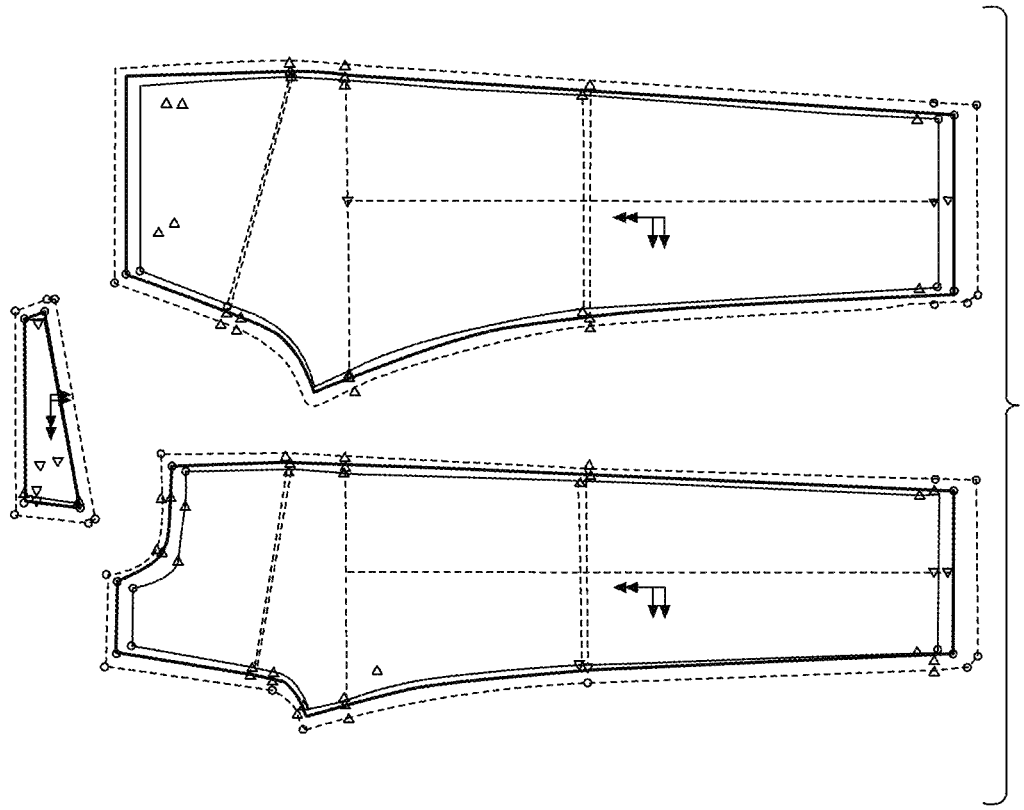

FIGS. 32-34 show a pattern making process. In pattern making, the three-dimensional jeans concept is converted to two-dimensional pieces or panels following final manpack. The pattern making can use a three-dimensional to two-dimensional conversion software or using existing two-dimensional pieces and adjusting them as per manpack. This software allows to adjust fabric shrinkage to base pattern first and then get all sizes (nest) following measurement chart or grading rules by fit.

Figure 35:
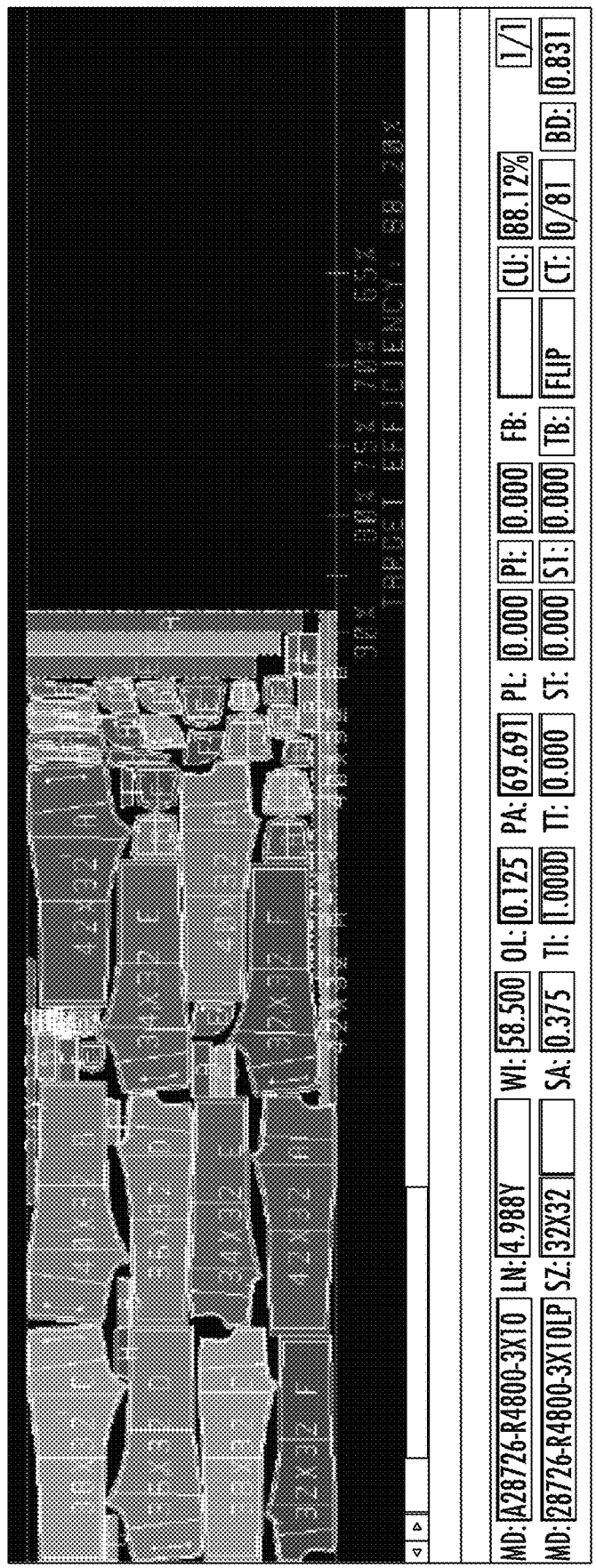
FIG. 35 shows a marker making process.

FIG. 35 shows a marker making process. A factory runs a marker where all jean panel pieces put together to optimize fabric usage. Marker making can be performed using marker making software, using automatic or manual operation.

Figure 36:
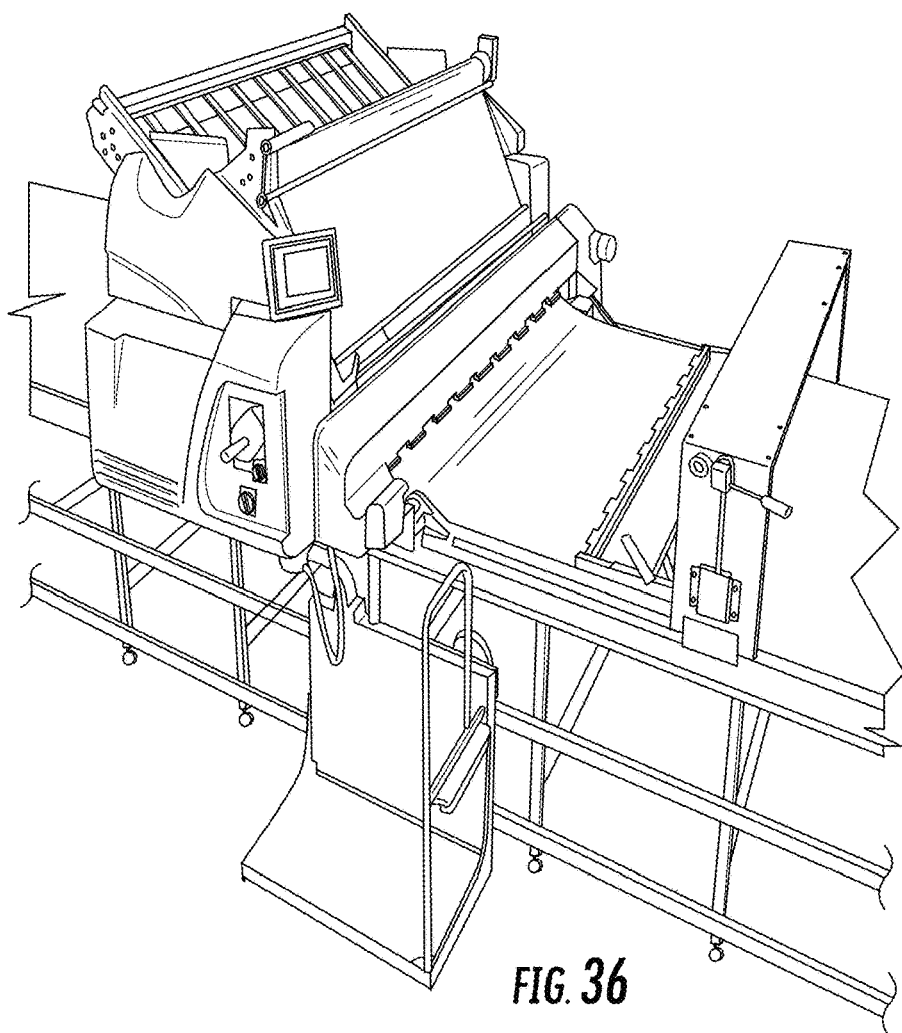
FIGS. 36-38 show a cutting process.
Figure 37:
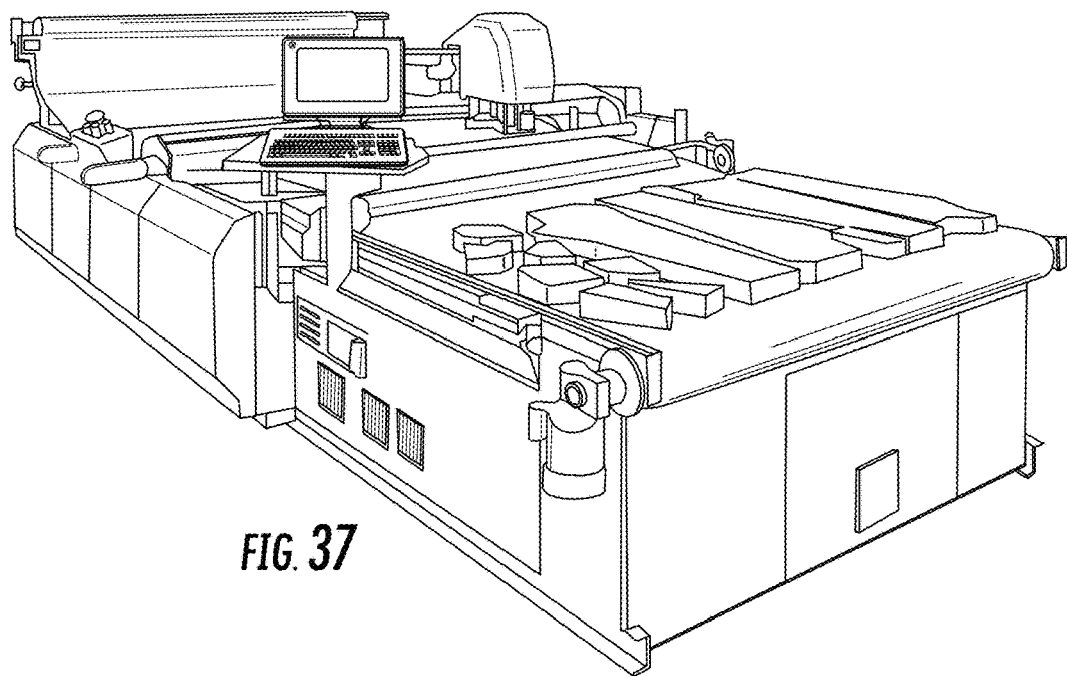
Figure 38:
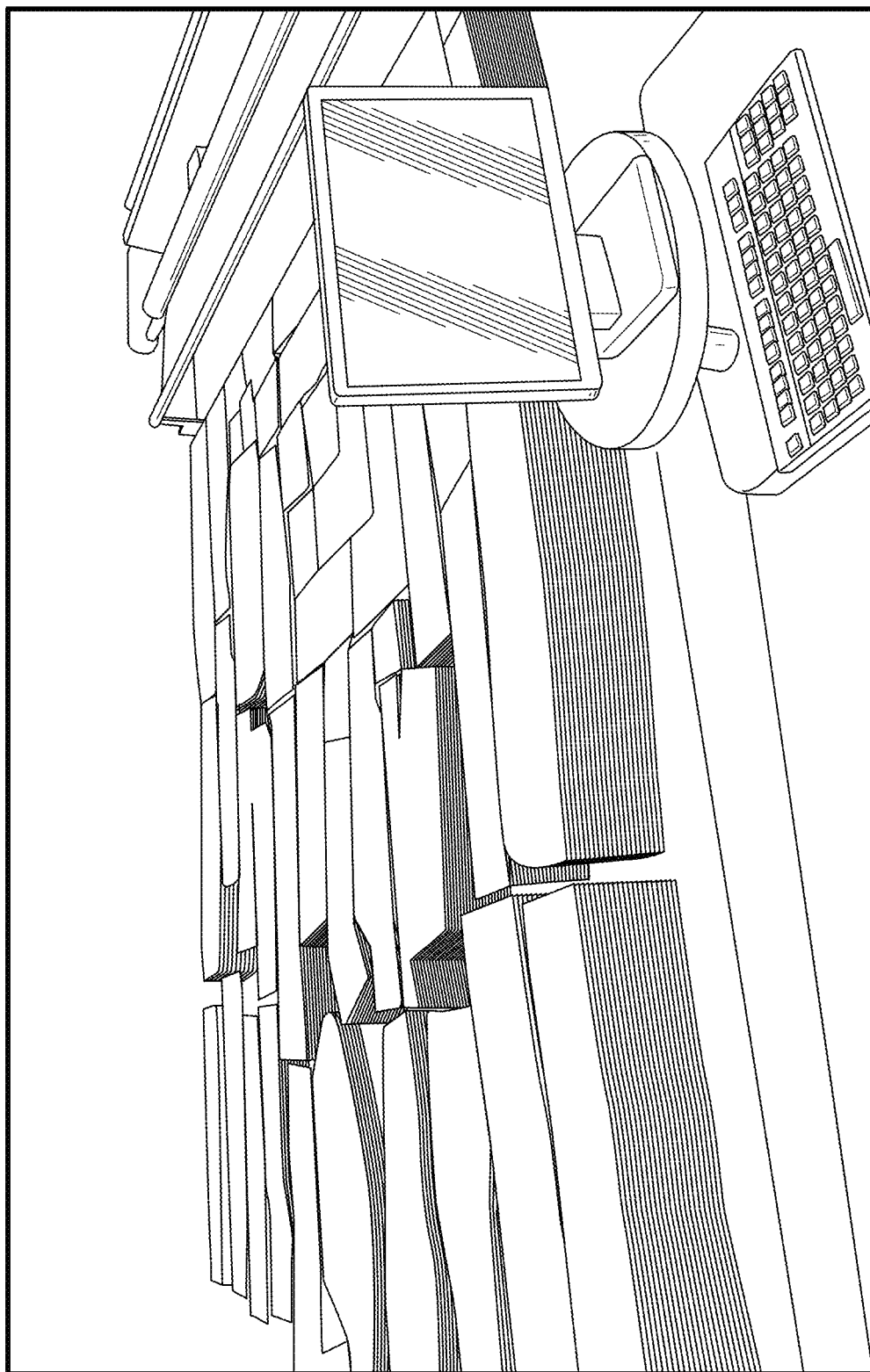

FIGS. 36-38 show a cutting process. Fabric is spread in multiple layers or plies for the marker length. Automatic spreaders can be used. Single layer spreading is also an option. The panel pieces are cut. After cutting all pieces, each individual layer-piece is numbered to avoid shade variation on the final garment. Bundles by size are moved to sewing area after this process. For example, the bundles can be moved by a carts on a conveyer belt. Operation of the cutting machine can be controlled by apparel management system 122.

Figure 39:
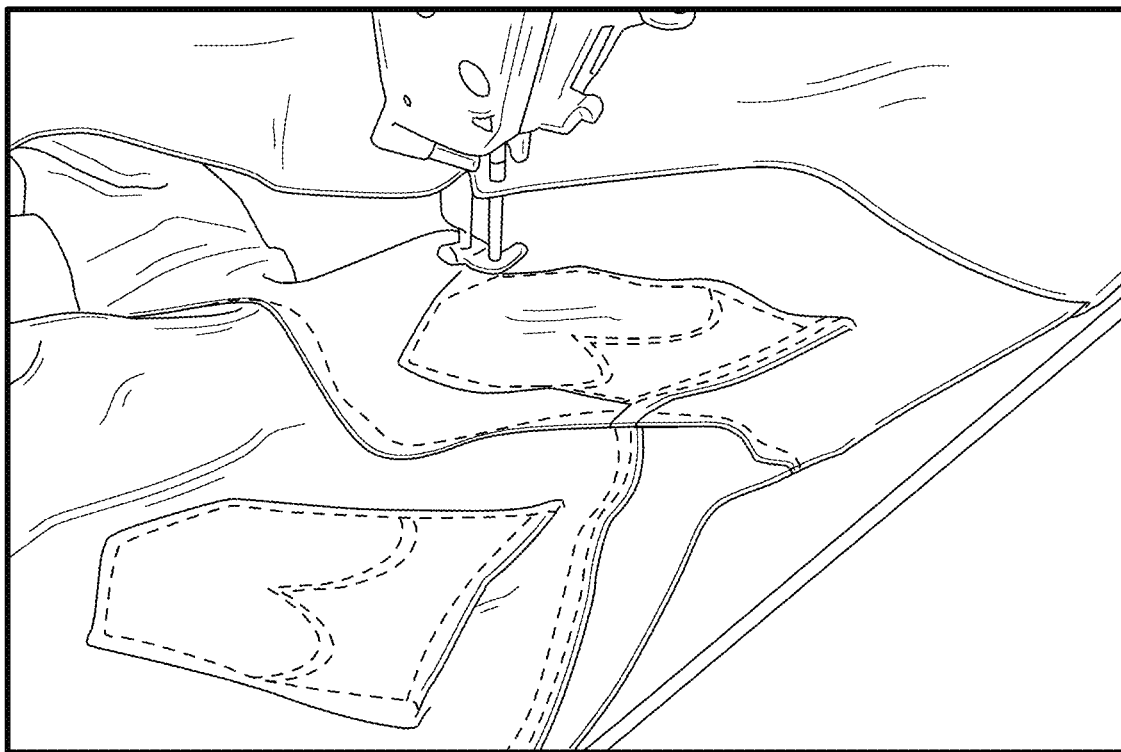
FIGS. 39-40 show a sewing process.
Figure 40:
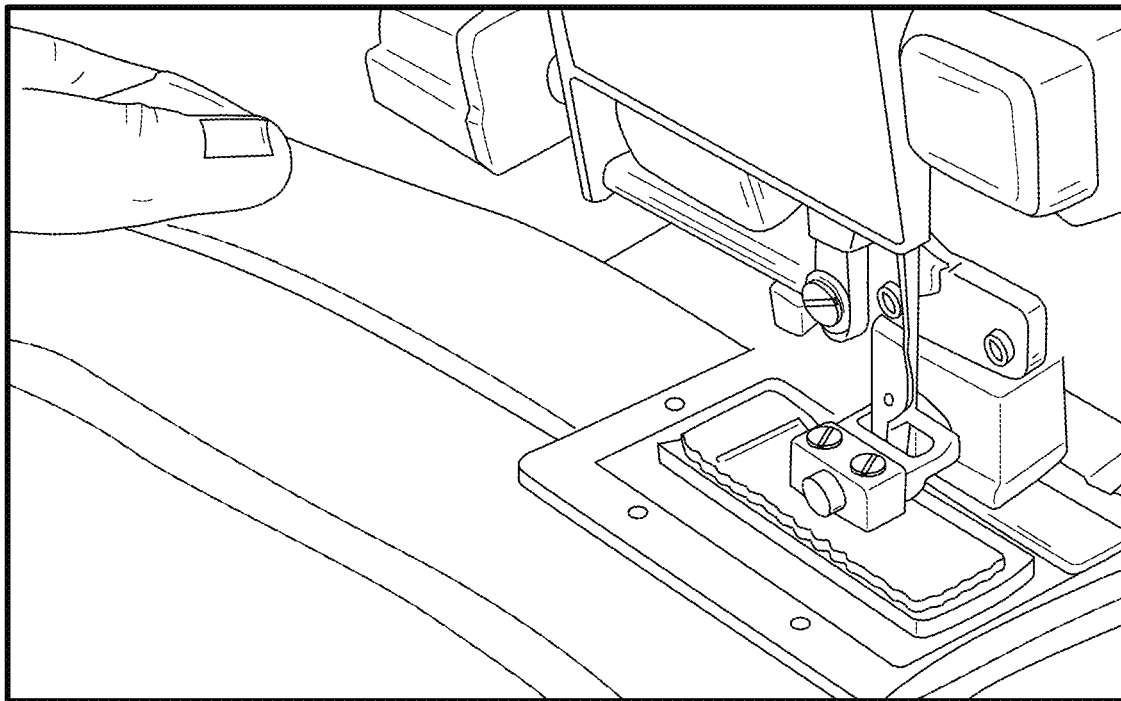

FIGS. 39-40 show a sewing process. Sewing assembles small pieces first and then attach to big panels (e.g., front and backs) to finalize assembling a jean, before the jeans are base washed for aesthetics. The sewing process can include automatic sewing and stitching of panels. Operation of the sewing machine can be controlled by apparel management system 122.

Figure 41:
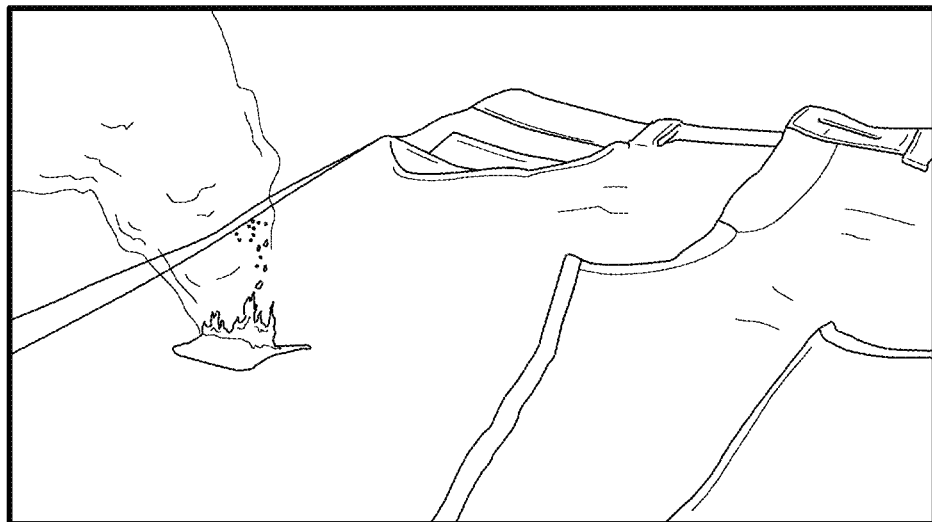
FIGS. 41-42 shows a finishing process using laser finishing.
Figure 42:
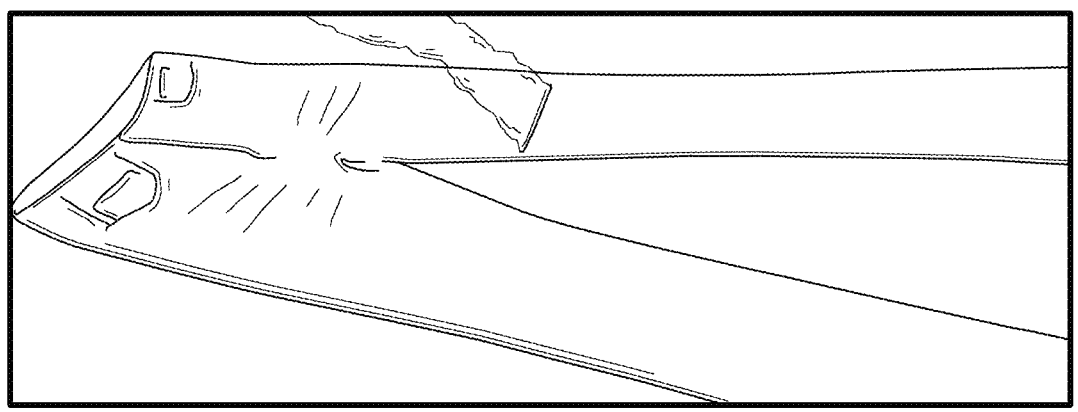

FIGS. 41-42 shows a finishing process using laser finishing. Operation of the laser can be controlled by apparel management system 122.

Figure 43:
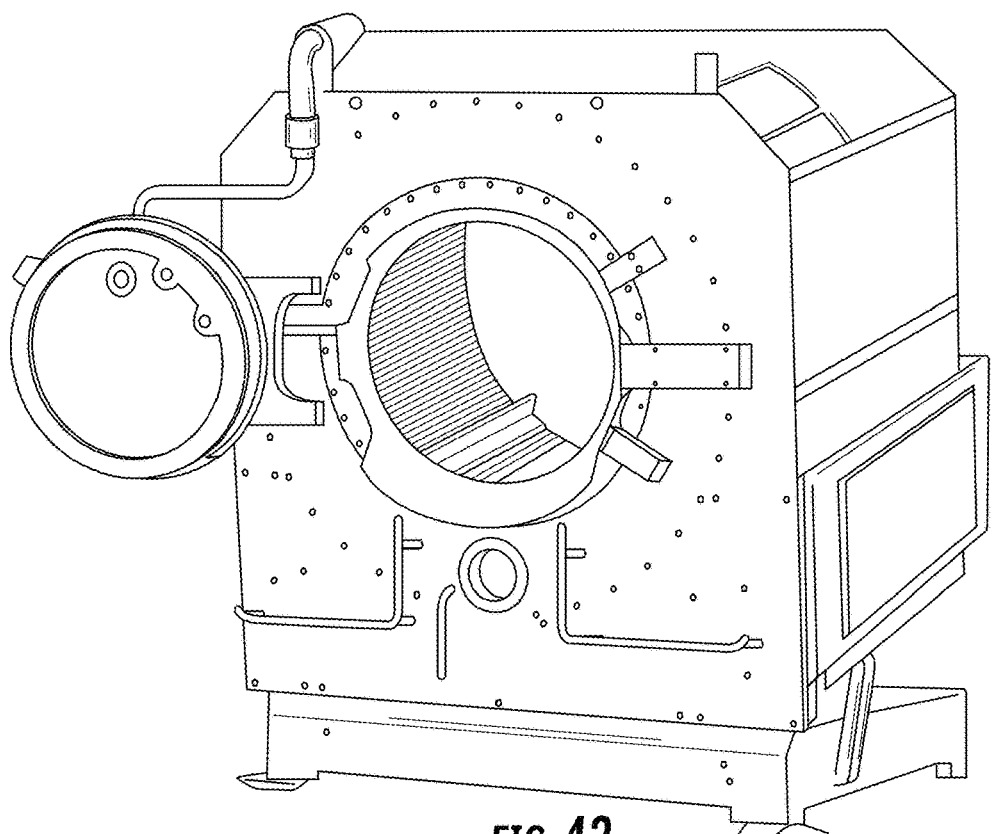
FIG. 43 shows a washer.
Figure 44:
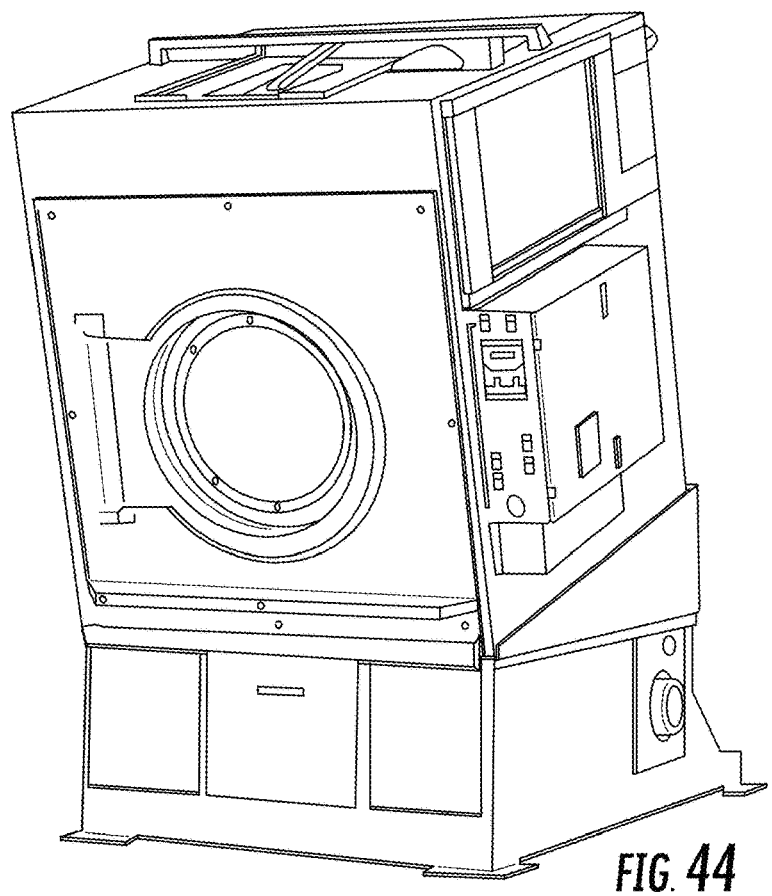
FIG. 44 shows a dryer used in processing jeans.

FIG. 43 shows a washer, and FIG. 44 shows a dryer used in processing jeans. After finishing, the garment is washed and dried. A postlaser finishing can include washing and drying. Operation of the washer and dryer can be controlled by apparel management system 122.

In an implementation, a system includes a collection of first garments of a first base template, a collection of second garments of a second base template, an ordering tool, and a laser finishing facility including a laser that performs laser finishing on assembled garment templates.

Each of the first garments is an assembled garment (e.g., pants, jeans, shorts, jacket, shirt, skirt, and others) made from fabric panels of a woven material having a warp yarn including indigo-dyed cotton yarn. The material can be a twill or a denim. The fabric panels are sewn together using thread. The assembled garment is washed according to a first base wash to obtain a first base finish. The garments of the first garments can include different sizing for those garments, where the different sizes are part of the same first base template. Customers can order or request their size for that first base template.

Similar to the first garments, each of the second garments is an assembled garment made from fabric panels of a woven material having a warp yarn including indigo-dyed cotton yarn. The fabric panels are sewn together using thread. The assembled garment is washed according to a second base wash to obtain a second base finish. The second base finish is different from the first base finish. For example, the second base finish can be a lighter shade of indigo than the first base finish. Or, the second base finish can be a darker shade of indigo than the first base finish. Many other overall base finishes are possible.

The ordering tool includes a digital design tool. For example, these tools can be provided as a mobile application, a Web browser tool, or desktop application. Inputs to the digital design tool include a selected base template from a number of base templates, which includes the first base template and the second base template, and a selected finishing pattern from a number of finishing patterns based on laser input files. An output of the digital design tool includes a preview tool that displays a preview image of the selected finishing pattern on the selected base template. The ordering tool generates a user order corresponding to the selected finishing pattern on the selected base template. The preview tool can show real-time changes (e.g., in computer display) in the preview image based on changes or updates by a user. For example, the preview tool can show an immediate change the user is making a modification.

The digital design tool can handle finishing pattern patterns, which can include wear patterns and damage asserts. These are assets that the laser marks by burning the patterns, pixels by pixel, on the garment. The preview image can include a three-dimensional (3D) viewing feature, where the user can rotate the image 360 degrees to have an all-around view of how the garment will appear after manufacture. The 3D preview can be generated by taking an image and performing a image transformation on that image based on the desired viewing angle.

An input to the laser finishing facility includes a user order from the ordering tool received through a network, which connects the ordering tool to the laser finishing facility. The network can be local area network or a wide area network, such as the Internet. Based on a laser input file associated with the user order, a laser removes selected amounts of material from the surface of a garment of the selected base template. For lighter pixel locations of the finishing pattern, a greater amount (e.g., greater depth or thickness) of the dyed cotton warp yarn is removed by a laser machine of the laser finishing facility, while for darker pixel locations of the finishing pattern, a lesser amount (e.g., lesser depth or thickness) of the dyed cotton warp yarn is removed by the laser.

An output of the laser finishing facility is a manufactured garment, such as pants, jeans, shorts, jacket, shirt, skirt, and others, with finishing pattern as selected by the ordering tool. The apparel with finishing pattern is created on-demand. Maintaining an inventory of apparel with a specific finishing pattern is not needed. This reduces inventory costs by matching customer demand more closely. On-demand manufacture is advantageous because exact customer demand is sometime difficult to forecast or estimate before traditional (not on-demand) manufacture for particular finishing patterns. Customer response and acceptance in fashion varies and change quickly. With on-demand manufacture, the laser has removed selected amounts of material from the surface according to the user order and the manufactured garment has an appearance as displayed by the digital design tool as the preview image.

Base garments can be stored in inventory (e.g., storage boxes, warehouse) before laser finishing at the laser finishing facility. By apply a finishing pattern later in the manufacturing process, this allows the storing the base templates instead of than storing finished garments. This reduces the waste and costs associated with scrapping or liquidating of finished garments that do not sell well because of low customer demand. Since any laser finishing pattern can be used for unmarked stored base templates, this minimizes the likelihood that the stored base templates would be wasted or scrapped.

With the ordering tool, the user or customer can specify a sizing of the garment to order. The sizing can be specified using traditional sizing approaches, or using a technique such as Curve ID described. For example, a user can select a sizing of a garment to order and the sizing is based on a difference between two different girth measurements.

The ordering tool allows the user to create a custom finishing pattern (e.g., freehand editing of an image such as using a pointing device, mouse, stylus, or finger) that can be applied to a base template. The ordering tool allows the user to create a semicustom finishing pattern that can be applied to a base template. The semicustom finishing pattern can be a modification of a preexisting finishing pattern. For example, the use can take a preexisting finishing pattern and make modifications to it. Also the user can move or position (relative to the base template), shift, or warp the pattern in order to modify it.

The digital design tool allows a user to save and upload a previously saved finishing pattern. For example, the user retrieve a previously save design and order that design or use that design as a starting point for a new design. The digital design tool allows a user to upload an image captured by a camera as a finishing pattern. For example, the user can take a picture of an existing pair of jeans with finishing or wear pattern. Then the tool will convert the picture to an appropriate laser input file to manufacture that wear pattern on a base template with similar characteristics in the picture, or on a different base template, for a new look.

The system can include a distribution facility or distribution center that is also connected to the network. An input to the distribution facility is the user order and manufactured garment from the laser finishing facility. An output of the distribution facility is a package containing the manufactured garment for shipment of the user order. The laser finishing facility and distribution facility can be housed in the building, such as different sections of the building or on different floors (e.g., connected by an elevator or stairwell, or both). The distribution facility can handle packaging and delivering the finished garment to the user that created the garment design using the digital design tool.

There can be an apparel management system. This apparel management system can provide or serve (via a server-client approach) the digital design tool via a software application to a user, receive the created design from the digital design tool, generate the order based on the created design, and send that order to the laser finishing facility for manufacture. The apparel management system can reside on a server that is electronically connected to all the different components of the system, and the apparel management system can govern or control operation of the on-demand laser finishing process.

A further implementation differs from the above-described implementations because the laser finishing is performed on the fabric roll before the garment is cut and sewn together. The ordering process is similar, but the manufacture is different. For example, in an implementation, a system includes a first fabric roll or blanket (e.g., cut portion from a fabric roll) of woven material, a second fabric roll, an ordering tool to create a user order, a laser finishing facility including a laser that performs laser finishing on fabric rolls before assembly into a garment, a cutting machine to cut the laser-finished panels from the fabric rolls, a sewing machine to assemble together the cut laser-finished panels into a sewn-together garment, and a washing machine that washes the sewn-together garment using a base wash recipe that corresponds to the requested finish in the user order. There is a dryer or drying machine to dry to washed garment, so that the manufactured garment has an appearance as displayed by the digital design tool as the preview.

The first fabric roll can be woven from a different yarn than the second fabric roll. For example, the yarn used in the first fabric rolls can have a weight, thickness, or stretch characteristic different from (e.g., greater or less than) the yarn used for the second fabric roll. The different base wash recipes during washing can be used to obtain different shades (e.g., darker or lighter) in the manufactured garment.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
a plurality of first garments of a first base template, wherein each of the first garments is an assembled garment made from fabric panels of a woven material that are sewn together using thread, and the assembled garment is washed according to a first base wash to obtain a first base finish;
a plurality of second garments of a second base template, wherein each of the second garments is an assembled garment made from fabric panels of a woven material that are sewn together using thread, the assembled garment is washed according to a second base wash to obtain a second base finish, and the second base finish is different from the first base finish;
an ordering tool, accessible to a user via a Web browser, comprising a digital design tool, wherein inputs to the digital design tool comprise a selected base template from a plurality of base templates comprising the first base template and the second base template, and a selected finishing pattern from a plurality of finishing patterns based on laser input files, an output of the digital design tool comprises a preview tool that displays a preview image of the selected finishing pattern on the selected base template, the ordering tool generates a user order corresponding to the selected finishing pattern on the selected base template, and the preview image is generated by a method comprising
generating an adjusted base image from the selected base template without the selected finishing pattern,
generating a pattern mask based on a laser input file associated with the selected finishing pattern,
for a pixel at a pixel location of the preview image, obtaining a first contribution by combining a first value associated with a pixel of the pattern mask at a pattern mask pixel location that corresponds to the pixel location of the preview image and a value of a pixel of the selected base template at a base template pixel location that corresponds to the pixel location of the preview image,
for the pixel at the pixel location of the preview image, obtaining a second contribution by combining a second value associated with the pixel of the pattern mask at the pattern mask pixel location that corresponds to the pixel location of the preview image and a value of a pixel of the adjusted base image at an adjusted base image pixel location that corresponds to the pixel location of the preview image, and
combining the first contribution and second contribution to obtain a combined value for the pixel at the pixel location of the preview image, wherein when the pixel of the preview image is displayed, a color of the pixel corresponds to the combined value; and
a laser finishing facility, coupled to a network, wherein an input to the laser finishing facility comprises the user order from the ordering tool received through the network, and based on a laser input file associated with the user order, a laser removes selected amounts of material from the surface of a garment of the selected base template.

2. The system of claim 1 wherein the network is the Internet.

3. The system of claim 1 wherein for lighter pixel locations of the finishing pattern, a greater amount of a warp yarn is removed by the laser, while for darker pixel locations of the finishing pattern, a lesser amount of the warp yarn is removed by the laser.

4. The system of claim 3 wherein an output of the laser finishing facility is a manufactured garment where the laser has removed selected amounts of material from the surface according to the user order and the manufactured garment has an appearance as displayed by the digital design tool as the preview image.

5. The system of claim 1 wherein the first base finish has a darker shade than the second base finish.

6. The system of claim 1 wherein the first garments of the first base template comprise garments having different sizes.

7. The system of claim 1 wherein via the ordering tool, a user can select a sizing of a garment to order.

8. The system of claim 1 wherein the digital design tool allows a user to create a custom finishing pattern that can be applied to one of the plurality of base templates.

9. The system of claim 1 wherein the digital design tool allows a user to create a semicustom finishing pattern that can be applied to one of the plurality of base templates, and the semicustom finishing pattern is a modification of a preexisting finishing pattern.

10. The system of claim 1 wherein the digital design tool allows a user to save and upload a previously saved finishing pattern.

11. The system of claim 1 wherein the digital design tool allows a user to upload an image captured by a camera as a finishing pattern.

12. The system of claim 1 wherein the preview tool shows real-time changes in the preview image based on changes or updates by a user.

13. The system of claim 1 comprising:
a distribution facility, coupled to the network, wherein an input to the distribution facility is the user order and manufactured garment from the laser finishing facility, and an output of the distribution facility is a package containing the manufactured garment for shipment of the user order.

14. The system of claim 13 wherein the laser finishing facility and distribution facility are housed in the same building.

15. The system of claim 1 wherein the first and second garments comprises jeans.

16. The system of claim 1 wherein the first and second garments comprises a denim material.

17. The system of claim 1 wherein the laser finishing facility comprises a washing machine and a dryer, and lasering by the laser, the manufactured garment is washed in the washing machine and dried in the dryer.

18. A system comprising:
a plurality of first jeans of a first base template, wherein each of the first jeans is an assembled jean made from fabric panels of a woven material that are sewn together using thread, and the assembled jean is washed according to a first base wash to obtain a first base finish;

a plurality of second jeans of a second base template, wherein each of the second jeans is an assembled jean made from fabric panels of a woven material that are sewn together using thread, the assembled jean is washed according to a second base wash to obtain a second base finish, and the second base finish is different from the first base finish;

an ordering tool, accessible to a user via a mobile device, comprising a digital design tool, wherein inputs to the digital design tool comprise a selected base template from a plurality of base templates comprising the first base template and the second base template, a selected finishing pattern from a plurality of finishing patterns based on laser input files, and a sizing of a garment desired by the user, an output of the digital design tool comprises a preview tool that displays a preview image of the selected finishing pattern on the selected base template, the ordering tool generates a user order corresponding to the selected finishing pattern on the selected base template, and the preview image is generated by a method comprising generating an adjusted base image from the selected base template without the selected finishing pattern, generating a pattern mask based on a laser input file associated with the selected finishing pattern, for a pixel at a pixel location of the preview image, obtaining a first contribution by combining a first value associated with a pixel of the pattern mask at a pattern mask pixel location that corresponds to the pixel location of the preview image and a value of a pixel of the selected base template at a base template pixel location that corresponds to the pixel location of the preview image, for the pixel at the pixel location of the preview image, obtaining a second contribution by combining a second value associated with the pixel of the pattern mask at the pattern mask pixel location that corresponds to the pixel location of the preview image and a value of a pixel of the adjusted base image at an adjusted base image pixel location that corresponds to the pixel location of the preview image, and combining the first contribution and second contribution to obtain a combined value for the pixel at the pixel location of the preview image, wherein when the pixel of the preview image is displayed, a color of the pixel corresponds to the combined value; and a laser finishing facility, coupled to a network, wherein an input to the laser finishing facility comprises the user order from the ordering tool received through the network, and based on a laser input file associated with the user order, a laser removes selected amounts of material from the surface of a pair of jeans of the selected base template in the sizing specified in user order.

19. The system of claim 18 wherein the network is the Internet.

20. The system of claim 18 wherein the mobile device is a smartphone.

21. The system of claim 18 wherein the mobile device is a tablet computer.

22. The system of claim 18 wherein the first base finish has a darker shade than the second base finish.

23. The system of claim 18 wherein the preview tool shows real-time changes in the preview image based on changes or updates by a user.

24. A system comprising:

a plurality of first garments of a first base template, wherein each of the first garments is an assembled garment made from fabric panels of a woven material that are sewn together using thread, and the assembled garment is washed according to a first base wash to obtain a first base finish;

a plurality of second garments of a second base template, wherein each of the second garments is an assembled garment made from fabric panels of a woven material that are sewn together using thread, the assembled garment is washed according to a second base wash to obtain a second base finish, and the second base finish is different from the first base finish;

an ordering tool, accessible to a user via a network, comprising a digital design tool, wherein inputs to the digital design tool comprise a selected base template from a plurality of base templates comprising the first base template and the second base template, and a selected finishing pattern from a plurality of finishing patterns based on laser input files, an output of the digital design tool comprises a preview tool that displays a preview image of the selected finishing pattern on the selected base template, the ordering tool generates a user order corresponding to the selected finishing pattern on the selected base template, and the preview image is generated by a method comprising generating an adjusted base image from the selected base template without the selected finishing pattern, generating a pattern mask based on a laser input file associated with the selected finishing pattern, for a pixel at a pixel location of the preview image, obtaining a first contribution by combining a first value associated with a pixel of the pattern mask at a pattern mask pixel location that corresponds to the pixel location of the preview image and a value of a pixel of the selected base template at a base template pixel location that corresponds to the pixel location of the preview image, for the pixel at the pixel location of the preview image, obtaining a second contribution by combining a second value associated with the pixel of the pattern mask at the pattern mask pixel location that corresponds to the pixel location of the preview image and a value of a pixel of the adjusted base image at an adjusted base image pixel location that corresponds to the pixel location of the preview image, and combining the first contribution and second contribution to obtain a combined value for the pixel at the pixel location of the preview image, wherein when the pixel of the preview image is displayed, a color of the pixel corresponds to the combined value; and a laser finishing facility, coupled to the network, wherein an input to the laser finishing facility comprises the user order from the ordering tool received through the network, and based on a laser input file associated with the user order, a laser removes selected amounts of material from the surface of a garment of the selected base template.

25. The system of claim 24 wherein the network is the Internet.

26. The system of claim 24 wherein the ordering tool executes on a smartphone.

27. The system of claim 24 wherein the ordering tool executes on a tablet computer.

28. The system of claim 24 wherein the ordering tool is accessed via a Web browser.

29. The system of claim 24 wherein the first base finish has a darker shade than the second base finish.

30. The system of claim 24 wherein the preview tool shows real-time changes in the preview image based on changes or updates by a user.

* * * * *